(12) United States Patent
Tsutaya

(10) Patent No.: US 7,210,362 B2
(45) Date of Patent: May 1, 2007

(54) DIAPHRAGM TYPE LOAD DETECTION SENSOR, LOAD DETECTION UNIT AND ELECTRONIC SCALE USING SAME

(75) Inventor: Takao Tsutaya, Shiroi (JP)

(73) Assignee: Tanita Corporation, Tokyo (JP)

( * ) Notice: Subject to any disclaimer, the term of this patent is extended or adjusted under 35 U.S.C. 154(b) by 262 days.

(21) Appl. No.: 10/687,700

(22) Filed: Oct. 20, 2003

(65) Prior Publication Data

US 2004/0083825 A1 May 6, 2004

(30) Foreign Application Priority Data

Nov. 5, 2002 (JP) ............................. 2002-320657
Nov. 5, 2002 (JP) ............................. 2002-320658
Nov. 5, 2002 (JP) ............................. 2002-320659

(51) Int. Cl.
*G01L 1/04* (2006.01)

(52) U.S. Cl. ............................................... 73/862.627

(58) Field of Classification Search ................. 73/781, 73/782, 794, 795, 862.391, 862.627
See application file for complete search history.

(56) References Cited

U.S. PATENT DOCUMENTS

| 4,102,210 A | * | 7/1978 | Couston et al. ............... 73/727 |
| 4,376,929 A | * | 3/1983 | Myhre ............................. 338/4 |
| 4,503,922 A | * | 3/1985 | Brosh et al. .......... 177/210 EM |
| 4,507,170 A | * | 3/1985 | Myhre ........................... 216/33 |
| 4,738,267 A | * | 4/1988 | Lazorthes et al. ........... 600/561 |
| 4,776,414 A |   | 10/1988 | Badcock |
| 4,800,973 A | * | 1/1989 | Angel ......................... 177/211 |
| 5,107,710 A | * | 4/1992 | Huck et al. ................... 73/708 |
| 6,003,380 A |   | 12/1999 | Sasaki et al. |
| 6,345,543 B1 | * | 2/2002 | Aoki ...................... 73/862.474 |
| 6,789,430 B1 | * | 9/2004 | Yoneda et al. ................ 73/754 |
| 6,997,058 B2 | * | 2/2006 | Toyoda ......................... 73/726 |

FOREIGN PATENT DOCUMENTS

| JP | 7-72028 | 3/1995 |
| JP | P2000-346723 A | 12/2000 |

* cited by examiner

*Primary Examiner*—Max Noori
(74) *Attorney, Agent, or Firm*—McDermott Will & Emery LLP

(57) ABSTRACT

Disclosed is a diaphragm type load detection sensor, comprising: a mounting portion attached to a installation plate; a strain generation portion provided on the mounting portion and having a load applied portion formed at the center thereof to which a load to be detected is applied; and a strain gauge provided on the strain generation portion. According to the present invention said strain gauge has sensing elements evenly provided on substantially whole periphery thereof and positioned at the predetermined distances from the center axis of the load applied portion of the strain generation portion.

83 Claims, 19 Drawing Sheets

DIAPHRAGM TYPE LOAD DETECTION SENSOR, LOAD DETECTION UNIT AND ELECTRONIC SCALE USING SAME

BACKGROUND OF THE INVENTION

1. Field of the Invention

The present invention relates to a diaphragm type load detection sensor, a load detection unit, and an electronic scale using the same.

2. Prior Art

At first, a diaphragm type load detection sensor in the prior art is briefly described with reference to FIG. 21. In particular, FIG. 21A is a plan view of the diaphragm type load detection sensor in the prior art; FIG. 21B is a cross section view of the sensor, taken along a line D—D in FIG. 21A; and FIG. 21C is a cross section view of the sensor, taken along a line E—E in FIG. 21A. The diaphragm type load detention sensor in the prior art comprises a mounting portion 1, a strain generation portion 2, and a load applied portion 3 having a projection formed thereon, wherein a strain gauge 4 including a plurality of sensing elements is affixed to the strain generation portion 2. The strain gauge 4 has a lead wire 4A connected thereto. In this example, the strain gauge 4 is affixed in a line such that the sensing elements are positioned in bilateral symmetry about the center of the projection of the load applied portion 3. In another example, the strain gauge is affixed to the strain generation portion in such manner that the sensing elements are positioned in bilateral and vertical symmetry about the center of the projection of the load applied portion (refer to Patent Laid-Open No. 2000-346723, FIG. 1).

Referring to FIG. 22 which is a cross section view of another diaphragm type load detection sensor in the prior art, it comprises a mounting portion 1, a strain generation portion 2, and a load applied portion 3, wherein a strain gauge 4 including a plurality of sensing elements is affixed to the strain generation portion 2. The strain gauge 4 has a lead wire 4A connected thereto. The diaphragm type load detection sensor is configured in such manner that when a load is applied to the load applied portion 3 the strain generation portion 2 is deformed, and consequently, the plurality of sensing elements of the strain gauge 4 are deformed. Then, the deformation of the sensing elements (or resistance change) is electrically detected via the lead wire 4A to detect the load applied to the load applied portion. In this example, the strain gauge 4 is affixed in a line such that the sensing elements are positioned in bilateral symmetry about the center of the projection of the load applied portion 3. As shown in FIG. 22, for example, the diaphragm type load detention sensor in the prior art is secured to an installation plate 5 such as a base of a scale using a screw 6 (refer to Patent Laid-Open No. 2000-346723). Alternatively, as shown in FIG. 23, it is secured to the installation plate 5 by welding the mounting portion 1 thereto, as indicated by a reference numeral "7".

However, in the diaphragm type load detention sensor in the prior art wherein the strain gauge is affixed in a line such that the sensing elements are positioned in bilateral symmetry about the center of the projection of the load applied portion, as described with reference to FIG. 21, if a load is obliquely applied to the load applied portion 3 (as indicated by an arrow "F"), as shown in FIG. 21C, then any difference in output may be produced due to such obliquely applied load "F". The reason for which is that the strain gauge (or the sensing element) would receive different contribution depending on whether a horizontal component of the obliquely applied load "F" to the load applied portion (as indicated by an arrow "H") is exerted in parallel with the gauge line, as shown in FIG. 21B, or in normal to the gauge line, as shown in FIG. 21C. This is also true for the diaphragm type load detention sensor, as disclosed in Patent Laid-Open No. 2000-346723. In particular, any difference in output may be produced depending on whether the load is obliquely applied to the direction of gauge line or the load is obliquely applied to the direction that is angled to the gauge line.

Furthermore, in the diaphragm type load detention sensor that is directly coupled to the installation plate 5 with screws, if a load is obliquely applied to the projection of the load applied portion 3 then the boundary between the mounting portion 1 and the installation plate 5 may be slightly shifted to change the restricting condition, thereby promoting occurrence of output difference depending on the direction of the obliquely applied load "F".

In view of the above an object of the present invention is to provide a diaphragm type load detection sensor, a load detection unit and an electronic scale using the same, which can solve the prior art problems, as described above.

SUMMARY OF THE INVENTION

In one aspect of the present invention there is provided a diaphragm type load detection sensor comprising: a mounting portion attached to a installation plate; a strain generation portion provided on the mounting portion and having a load applied portion formed at the center thereof to which a load to be detected is applied; and a strain gauge provided on the strain generation portion, wherein said strain gauge has sensing elements evenly provided on substantially whole periphery thereof and positioned at the predetermined distances from the center axis of the load applied portion of the strain generation portion.

According to one embodiment of the present invention a projection is formed on the load applied portion at the center axis thereof and said sensing elements are provided on a surface of the strain generation portion at such side that is opposite to the side where said projection is formed.

According to another embodiment of the present invention said sensing elements have a pattern wherein the sensing element is disposed to receive a strain in the peripheral direction and a pattern wherein the sensing element is disposed to receive a strain in the radial direction.

According to further embodiment of the present invention said strain gauge has terminals provided outside of the sensing elements and is disposed on the strain generation portion in such manner that said sensing elements are positioned on the strain generation portion and said terminals are positioned on the mounting portion.

According to yet further embodiment of the present invention said mounting portion is attached to the installation plate with a flexible resilient member interposed therebetween.

According to yet further embodiment of the present invention said flexible resilient member is formed from rubber material.

According to yet further embodiment of the present invention said flexible resilient member is secured to the mounting portion or the installation plate with an adhesion means, an adhesive agent, a fastening screw, a guide member, a mating connection or an integral molding process.

In another aspect of the present invention there is provided a load detection unit comprising: a diaphragm type load detection sensor; a case; a transmission assembly; and a support member, wherein said diaphragm type load detection sensor has a mounting portion, a strain generation portion provided on the mounting portion and having a load applied portion formed at the center thereof to which a load to be detected is applied, and a strain gauge provided on the strain generation portion; said case is attached to an installation plate for guiding the diaphragm type load detection sensor; said transmission assembly transmits a load to be detected to the load applied portion of the diaphragm type load detection sensor; said support member supports the transmission assembly on the case; and said strain gauge has sensing elements evenly provided on substantially whole periphery thereof and positioned at the predetermined distances from the center axis of the load applied portion of the strain generation portion.

According to one embodiment of the present invention the load detection unit further comprises at least one of a flexible resilient member contained in the case and interposed between the mounting portion of the diaphragm type load detection sensor and the installation plate, or another flexible resilient member provided at such side of the transmission assembly that receives a load to be detected.

According to another embodiment of the present invention said at least one of the flexible resilient member or another flexible resilient member is formed from rubber material.

According to further embodiment of the present invention said transmission assembly is coupled to the load applied portion with freedom.

According to yet further embodiment of the present invention said support member is a leaf spring including an outer peripheral strip permanently coupled to the case, an inner peripheral strip freely coupled to the transmission assembly, and flexible strips for coupling therebetween.

According to yet further embodiment of the present invention said flexible strips are plural beams formed in the direction of rotation about the center axis of the inner peripheral strip.

In further aspect of the present invention there is provided an electronic scale comprising: a diaphragm type load detection sensor; a base; a platform; and a lever, wherein said diaphragm type load detection sensor comprises: a mounting portion attached to a installation plate; a strain generation portion provided on the mounting portion and having a load applied portion formed at the center thereof to which a load to be detected is applied; and a strain gauge provided on the strain generation portion, wherein said strain gauge has sensing elements evenly provided on substantially whole periphery thereof and positioned at the predetermined distances from the center axis of the load applied portion of the strain generation portion, and said lever receives load applied to the platform and transmits it to the load applied portion of the diaphragm type load detection sensor.

In yet further aspect of the present invention there is provided an electronic scale comprising: a diaphragm type load detection sensor; a base; and a platform, wherein said diaphragm type load detection sensor comprises: a mounting portion attached to a installation plate; a strain generation portion provided on the mounting portion and having a load applied portion formed at the center thereof to which a load to be detected is applied; and a strain gauge provided on the strain generation portion, wherein said strain gauge has sensing elements evenly provided on substantially whole periphery thereof and positioned at the predetermined distances from the center axis of the load applied portion of the strain generation portion, and said platform is coupled to the load applied portion of the diaphragm type load detection sensor.

In yet further aspect of the present invention there is provided an electronic scale using a load detection unit comprising: a diaphragm type load detection sensor; a case; a transmission assembly; and a support member, wherein said diaphragm type load detection sensor has a mounting portion, a strain generation portion provided on the mounting portion and having a load applied portion formed at the center thereof to which a load to be detected is applied, and a strain gauge provided on the strain generation portion; said case is attached to an installation plate for guiding the diaphragm type load detection sensor; said transmission assembly transmits a load to be detected to the load applied portion of the diaphragm type load detection sensor; said support member supports the transmission assembly on the case; and said strain gauge has sensing elements evenly provided on substantially whole periphery thereof and positioned at the predetermined distances from the center axis of the load applied portion of the strain generation portion.

BRIEF DESCRIPTION OF THE DRAWINGS

The present invention will now be described in detail with reference to the accompanying drawings, in which:

FIG. 1 is a view of a diaphragm type load detention sensor according to one embodiment of the present invention.

FIG. 4 is a view of a load detection unit according to one embodiment of the present invention which is installed to an installation plate such as a platform of a scale.

FIG. 10 is a view illustrating one embodiment of an electronic scale incorporating the load detection unit according to the present invention, as described above.

FIG. 11 is a view of a diaphragm type load detention sensor according to one embodiment of the present invention that is attached to an installation plate, i.e. a base of a scale.

FIG. 12 is a view of a diaphragm type load detention sensor according to another embodiment of the present invention that is attached to an installation plate, i.e. a base of a scale.

FIG. 13 is a view of a diaphragm type load detention sensor according to further embodiment of the present invention that is attached to an installation plate, i.e. a base of a scale.

FIG. 14 is a view of a diaphragm type load detention sensor according to yet further embodiment of the present invention that is attached to an installation plate, i.e. a base of a scale.

FIG. 16 is a view of a diaphragm type load detention sensor according to one embodiment of the present invention incorporating the strain gauge for diaphragm in FIG. 15.

FIG. 17 is a view of a diaphragm type load detention sensor according to another embodiment of the present invention incorporating the strain gauge for diaphragm in FIG. 15.

FIG. 18 is a view of a load detection unit according to one embodiment of the present invention which is installed to an installation plate such as a platform of a scale.

FIG. 21 is a view of a conventional diaphragm type load detection sensor.

FIG. 25 is a view of a conventional diaphragm type load detection sensor incorporating a conventional strain gauge for diaphragm.

DESCRIPTION OF THE PREFERRED EMBODIMENT

Firstly, referring to FIGS. 1 to 10, one aspect of the present invention will be described in more detail with respect to configuration and layout of sensing elements of a strain gauge and mounting of a diaphragm type load detention sensor.

Figure 1A:
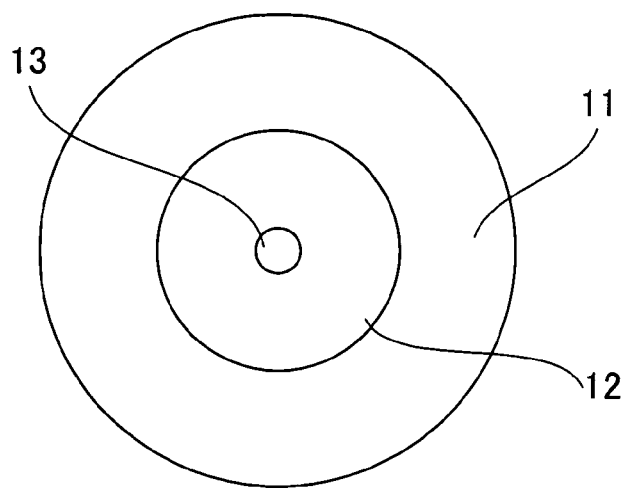
FIG. 1A is a plan view of the sensor.
Figure 1B:
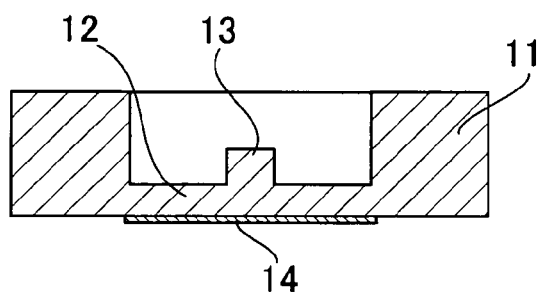
FIG. 1B is a cross section view of the sensor.
Figure 1C:
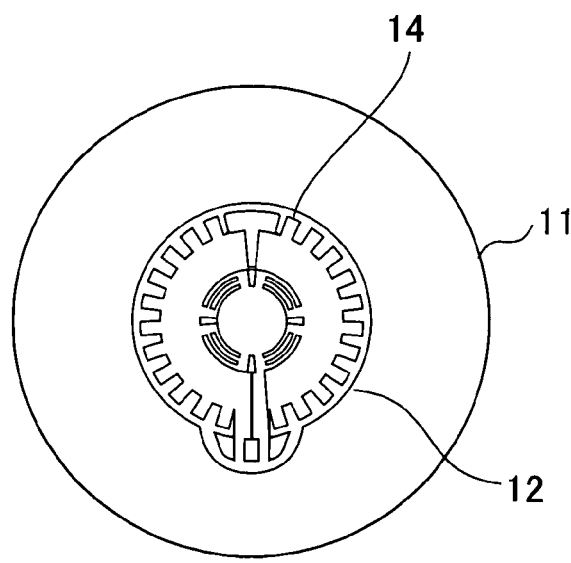
FIG. 1C is a bottom view of the sensor.

FIG. 1 is a view of a diaphragm type load detention sensor according to one embodiment of the present invention: FIG. 1A is a plan view of the sensor; FIG. 1B is a cross section view of the sensor; and FIG. 1C is a bottom view of the sensor. As shown in the figures, the diaphragm type load detention sensor of the present invention comprises a mounting portion 11, a strain generation portion 12, and a load applied portion 13 having a projection formed thereon, wherein a strain gauge 14 including a plurality of sensing elements is affixed to the strain generation portion 12.

Figure 2:
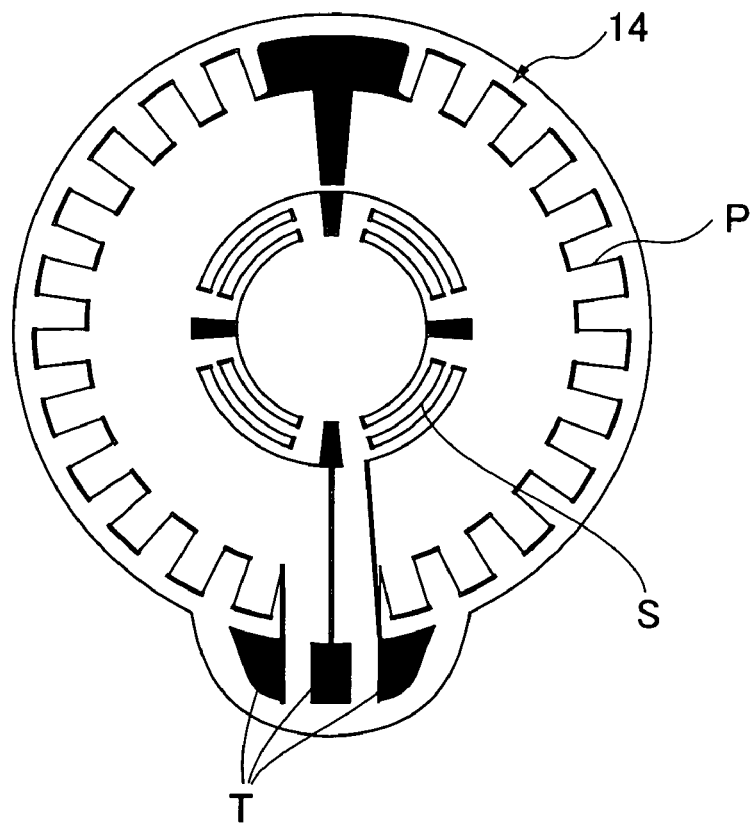
FIG. 2 is a view illustrating in more detail the strain gauge adhered to the strain generation portion of the sensor.

FIG. 2 is a view illustrating in more detail the strain gauge 14 adhered to the strain generation portion 12 of the sensor. As is apparent in FIG. 2, the strain gauge 14 is configured in such manner that sensing elements "S" and "P" connected across terminals "T" are disposed at the predetermined distance from the center of the projection of the load applied portion 13. In this embodiment the sensing element "S" is disposed in such pattern that receives any strain in peripheral direction, but in another embodiment it may be disposed in different pattern that receives any strain in radial direction. On the other hand, in this embodiment, the sensing element "P" is disposed in such pattern that receives any strain in radial direction, but it may be disposed in different pattern that receives any strain in peripheral direction. Both of the sensing elements "S" and "P" are evenly provided on substantially whole periphery of the strain gauge 14, except for one portion.

Figure 3:
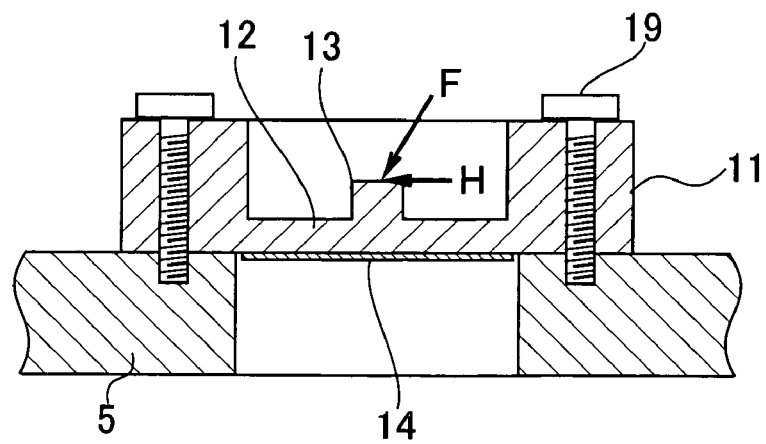
FIG. 3 is a cross section view of the diaphragm type load detection sensor, as shown in FIG. 1, which is installed onto an installation plate with fastening screws.

FIG. 3 is a cross section view of the diaphragm type load detection sensor, as shown in FIG. 1, which is installed onto an installation plate 5, e.g., a base of a scale, with fastening screws 19. According to the configuration of the gauge 14 in the embodiment, as described above, even if any load is obliquely applied to the projection of the load applied portion 13 from any direction (as indicated by an arrow "F"), as shown in FIG. 3, the sensing elements "S" and "P" themselves evenly receive a horizontal component (as indicated by an arrow "H") of the obliquely applied load "F". Therefore, it is possible to minimize any fluctuation in output of the gauge 14 caused depending on the direction in which the load is obliquely applied to the projection of the load applied portion 13.

Figure 4A:
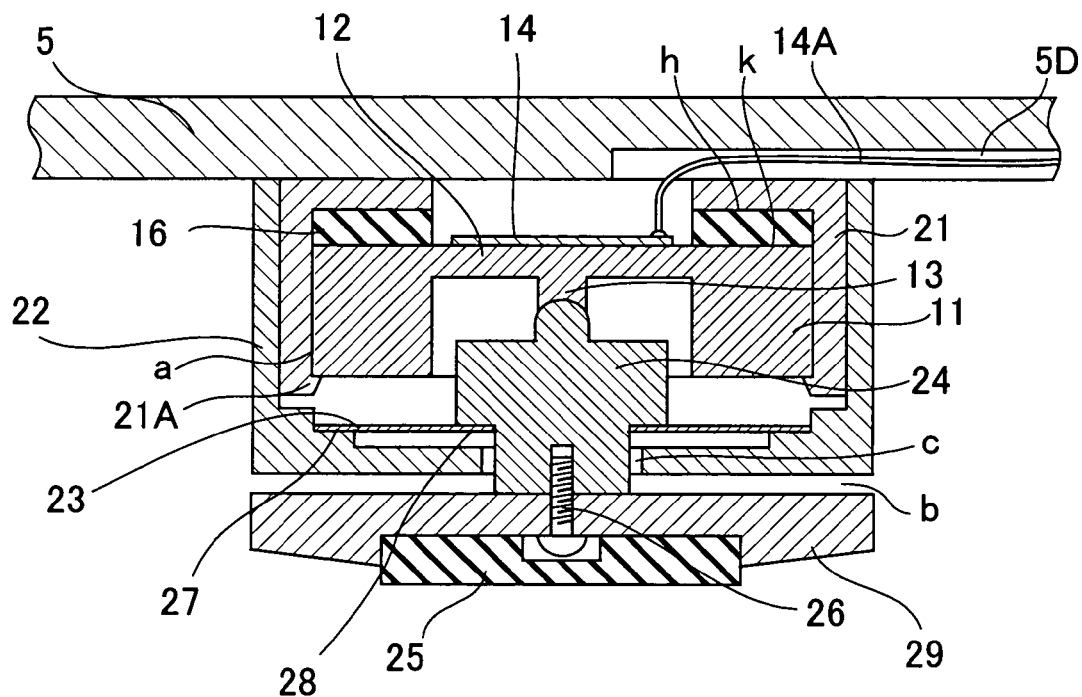
FIG. 4A is a schematic cross section view of the unit.
Figure 4B:
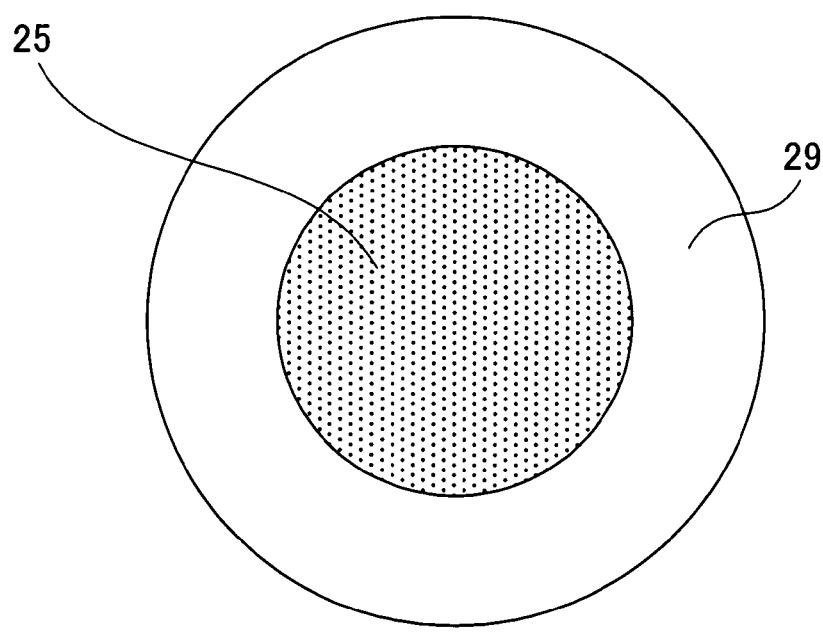
FIG. 4B is a bottom view of the unit.

FIG. 4 is a view of a load detection unit according to one embodiment of the present invention which is installed to an installation plate such as a platform of a scale: FIG. 4A is a schematic cross section view of the unit; and FIG. 4B is a bottom view of the unit. As shown in the figures, the load detection unit comprises the diaphragm type load detection sensor of the present invention, as described with reference to FIGS. 1 to 3. As shown in FIG. 4A, the diaphragm type load detection sensor comprises the mounting portion 11, the strain generation portion 12, and the load applied portion 13, wherein the strain gauge 14 including of a plurality of sensing elements is affixed to the strain generation portion 12. The strain gauge 14 has a lead wire 14a connected thereto. The lead wire 14a runs through a groove 5D in the installation plate 5 and connects to any load detection circuit (not shown). The projection of the load applied portion 13 is provided with a recess in the form of a half sphere.

The load detection unit in this embodiment further comprises: a first flexible resilient member 16; a case made up of a holder 21 and a sensor cover 22; a transmission assembly made up of a leg 29, a transmission body 24, a second flexible resilient member 25 and a screw 26; and a support member 23. In particular, the first flexible resilient member 16 and the second flexible resilient member 25 are formed from any rubber material, for example, and the support member 23 is formed from any leaf spring, for example, as is described latter.

The holder 21 is combined with the diaphragm type load detection sensor through the first flexible resilient member 16 therebetween by latching a pawl 21A on the holder 21 to the mounting portion 11. The first flexible resilient member 16 is provided in at least any partial area between a flat surface "h" of the holder 21 and one surface "k" of the mounting portion 11 so that the entire diaphragm type load detection sensor is lifted off the flat surface "h" of the holder 21. A boundary "a" between the holder 21 and the mounting portion 11 is provided with narrower clearance that makes possible slide movement between the holder 21 and the mounting portion 11. In this embodiment the first flexible resilient member 16 is provided, as described above, but it is not necessary.

The sensor cover 22 is permanently coupled to the outer periphery of the support member 23, as indicated at "27". However, the transmission body 24 is not permanently coupled to the inner periphery of the support member 23, as indicated at "28". In other word, they are freely coupled to each other.

Figure 5:
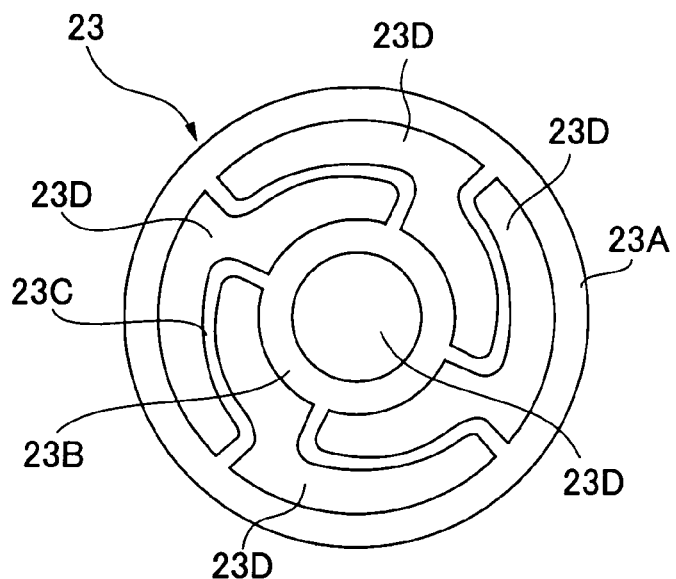
FIG. 5 is a plan view illustrating in more detail the support member of the load detection unit.

FIG. 5 is a plan view illustrating the support member 23 in more detail. As shown in FIG. 5, the support member 23 is formed from any spring plate blank by stamping to have an outer peripheral strip 23A, an inner peripheral strip 23B, and a plurality of flexible strips 23C for coupling therebetween (which are capable of flexing in any direction angled to the vertical direction as well). Reference character "23D" represents an opening caused by stamping the blank. The flexible strips 23C can be flexed according to movement of the transmission body 24 in not only vertical direction, but also in any direction angled to the vertical direction.

Although not specifically shown, the sensor cover 22 and the holder 21 are latched to each other by any suitable pawl formed thereon.

The transmission body 24 extends to outside of the sensor cover 22 and it is coupled by the screw 26 to the leg 29 on which the second flexible resilient member 25 is provided. A convex end portion (in the form of a half sphere) of the transmission body 24 freely abuts the concave end portion (also in the form of a half sphere) of the load applied portion 13. The clearance "b" between the sensor cover 22 and the leg 29, and the clearance "c" between the sensor cover 22 and the transmission body 24 are set to any value in the allowable range within which the transmission assembly is allowed to move (or in other words, any of the flexible strips causes no plastic deformation). If the transmission assembly tries to move beyond such allowable range then the sensor cover 22 would abut the leg 29 or the transmission body 24, thereby preventing the transmission assembly from excessively moving.

The load detection unit is assembled in such manner that the holder 21 is attached to the installation plate such as the cover of a scale and the leg 29 is placed on the foundation such as a floor, for example.

According to the configuration of the load detection unit, as described above, even if the convex half-spherical end portion of the transmission body 24 would obliquely apply the load to the concave half-spherical end portion of the load applied portion 13 as the result of the fact that the installation plate to which the load detection unit is attached is flexed upon application of the load or the load detection unit is attached to the uneven installation plate having irregularities, then, the sensing elements themselves can evenly receive a horizontal component of the obliquely applied load, which makes possible to minimize any fluctuation in output of the gauge caused depending on the direction in which the load is obliquely applied to the projection of the load applied portion 13, as already described with reference to the embodiment of the diaphragm type load detection sensor.

Figure 6:
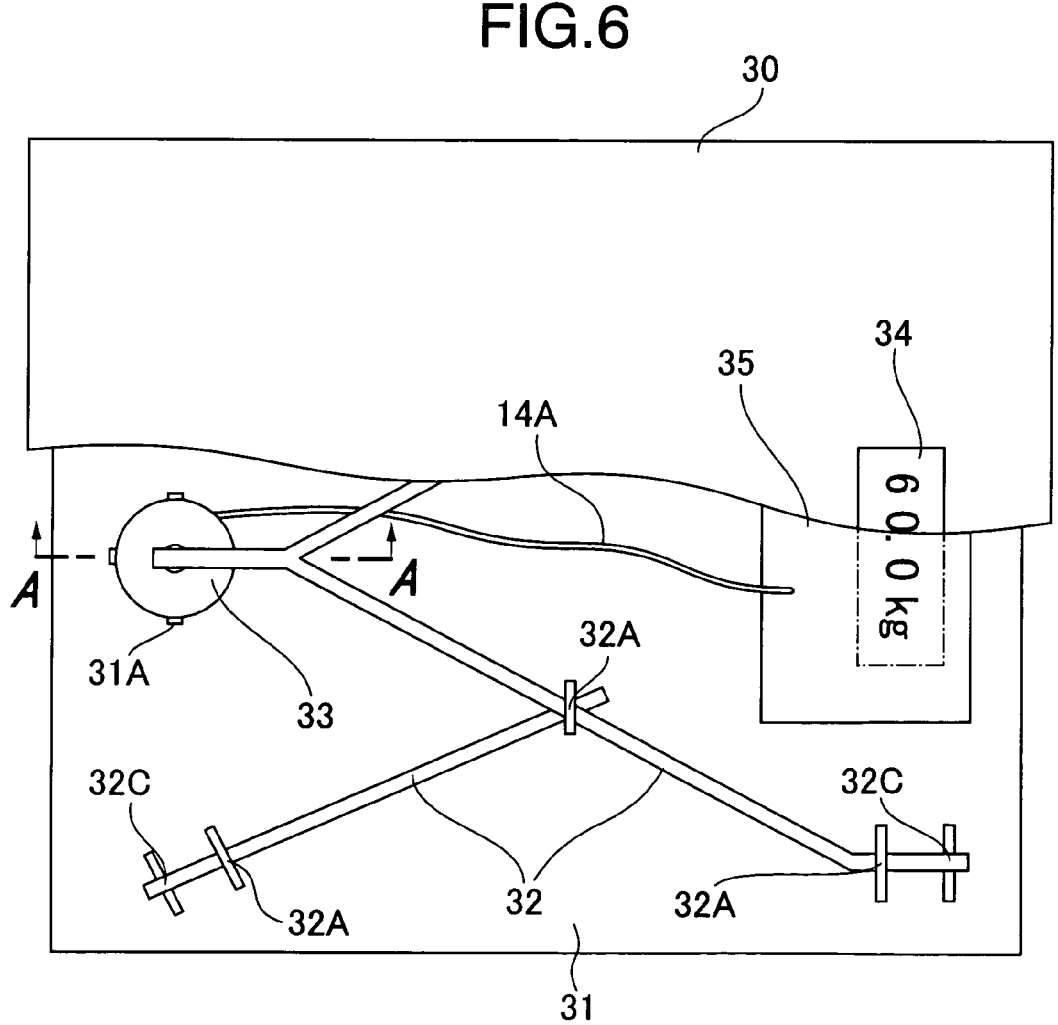
FIG. 6 is a plan view partially broken for illustrating one embodiment of an electronic scale incorporating the diaphragm type load detection sensor of the present invention.
Figure 7:
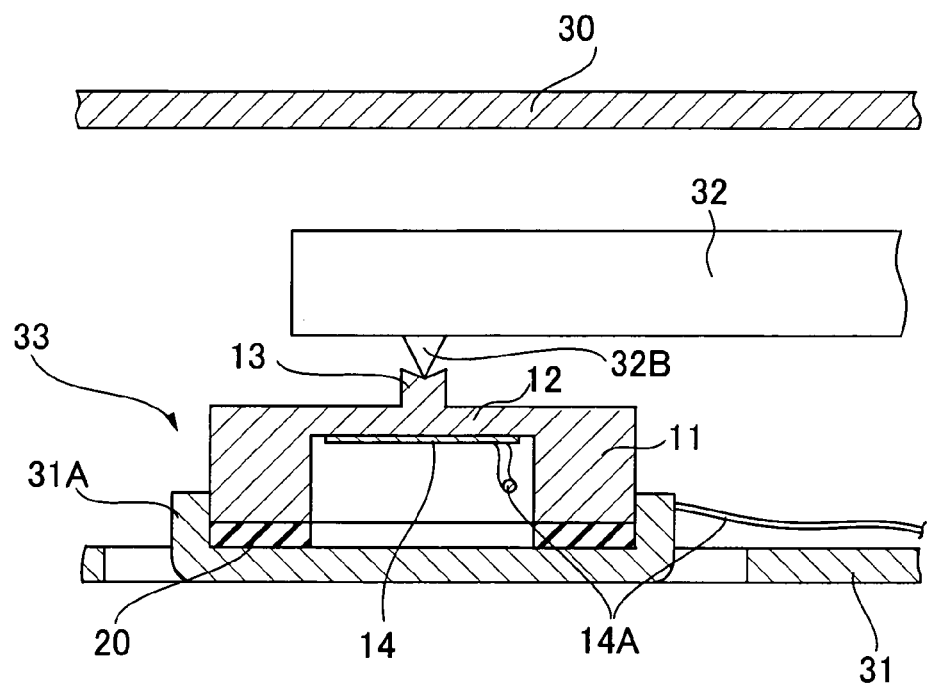
FIG. 7 is a cross section view of the electronic scale, taken along a line A-A in FIG. 6.

FIG. 6 is a plan view partially broken for illustrating one embodiment of an electronic scale incorporating the diaphragm type load detection sensor according to the present invention, as described above. FIG. 7 is a cross section view of the electronic scale, taken along a line A—A in FIG. 6. As shown in the figures, the electronic scale in this embodiment is a commonly known popular type weight meter for home use (mainly including a platform 30, a base 31, levers 32, a diaphragm type load detection sensor 33, a display unit 34, etc.). In this embodiment the diaphragm type load detection sensor 33 of the present invention is provided on a force point 32B (i.e. a point to which a force is applied to balance against the load on a load acting point 32A) of the lever 32. The force point 32B is configured to have a conical shape, and a reference character "32C" in FIG. 6 represents a furculum of the lever 32.

As shown in the cross section view of FIG. 7, the diaphragm type load detection sensor 33 is positioned on the base 31 with the aid of a guide 31A that is stamped and formed in the base 31 and with a flexible resilient member 20 made of rubber, etc., interposed therebetween. The projection of the load applied portion 13 is formed to have a conical recess into which the apex of the force point 32A of the lever 32 is inserted. A lead wire 14A of the strain gauge 14 is passed through a hole in the mounting portion 11 and is connected to an electronic circuit board 35 for calculating the load value based on the load signal detected by the strain gauge 14 and for displaying the calculation result on a display unit 34. In this embodiment the flexible resilient member 20 is provided, but it is not necessarily provided in other embodiment.

Figure 8:
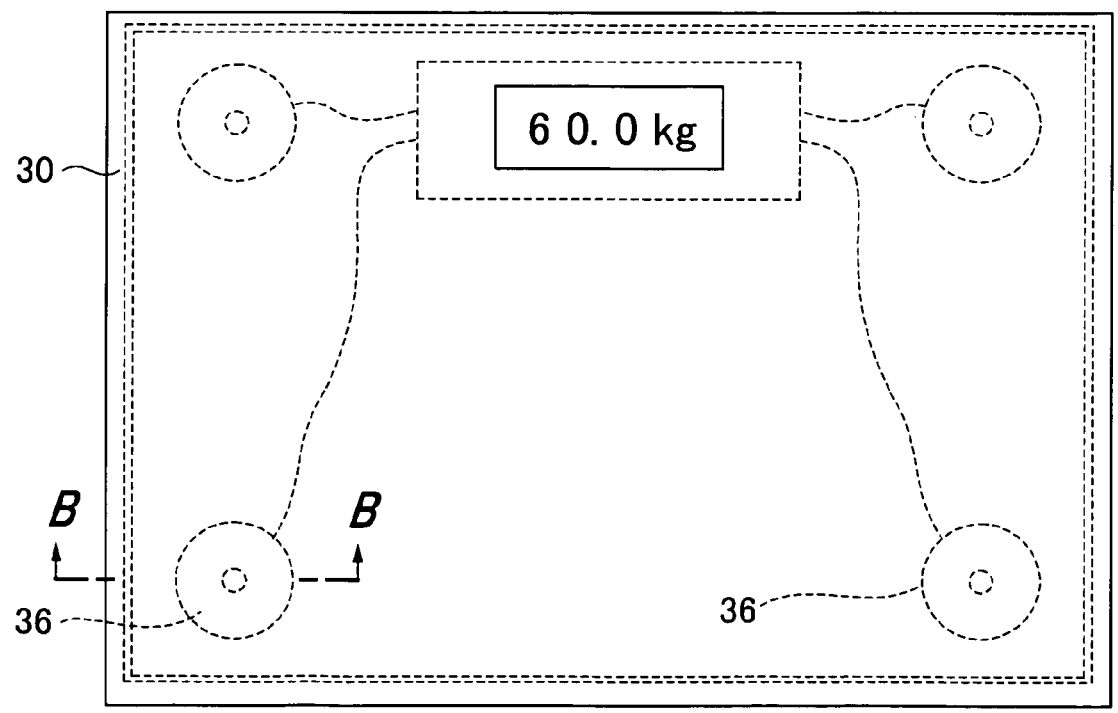
FIG. 8 is a plan view illustrating another embodiment of an electronic scale incorporating the diaphragm type load detection sensor of the present invention.
Figure 9:
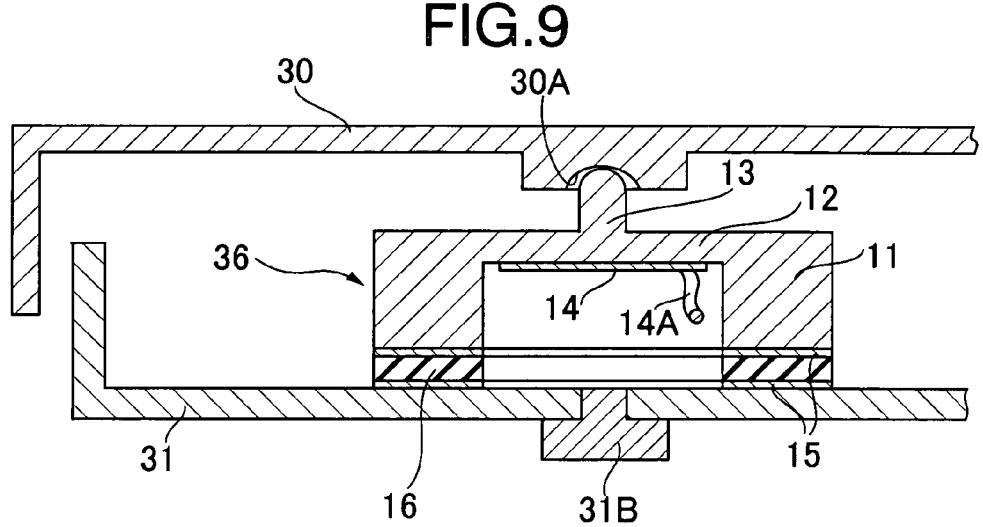
FIG. 9 is a cross section view of the electronic scale, taken along a line B—B in FIG. 8.

FIG. 8 is a plan view illustrating another embodiment of an electronic scale incorporating the diaphragm type load detection sensor according to the present invention, as described above. FIG. 9 is a cross section view of the electronic scale, taken along a line B—B in FIG. 8. As shown in the figures, the electronic scale in this embodiment includes four diaphragm type load detection sensors 36 each provided at each of four corners between a base 31 and a platform 30.

The load detection sensor 36 is disposed in such manner that a mounting portion 11 is affixed, by a double-sided adhesive tape 15, to a base 31 with a flexible resilient member 16 interposed therebetween, and a convex half-spherical end portion of a load applied portion 13 abuts a concave half-spherical receive portion 30A of the platform 30. In this embodiment a leg 31B is positioned immediately beneath the load applied portion 13 in order to minimize any effect of flexure of the base 31. However, the present invention is not limited to such configuration. Furthermore, in this embodiment the flexible resilient member 16 is provided, but it is not necessarily provided in other embodiment.

According to the configuration of the electronic scale, as described above, even if the force point 32B of the lever 32 or the receive portion 30A of the platform 30 would obliquely apply the load to the projection of the load applied portion 13 as the result of the fact that the platform 30 is flexed when placing some goods, products, etc. thereon or the load detection unit is mounted to the uneven platform having irregularities, then, the sensing elements themselves can evenly receive a horizontal component of the obliquely applied load, which makes possible to minimize any fluctuation in output of the gauge caused depending on the direction in which the load is obliquely applied to the projection of the load applied portion 13, as already described with reference to the embodiment of the diaphragm type load detection sensor.

Figure 10A:
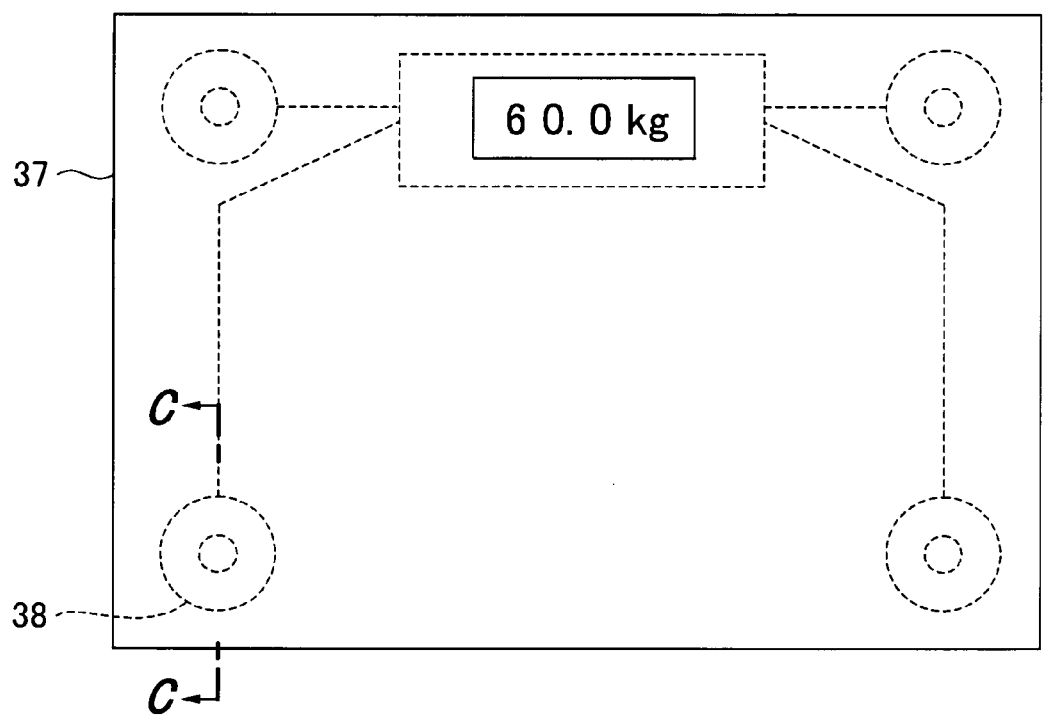
FIG. 10A is a plan view of the scale.
Figure 10B:
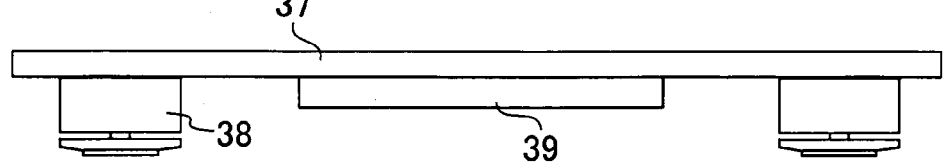
FIG. 10B is an elevation view of the scale.

FIG. 10 is a view illustrating one embodiment of an electronic scale incorporating the load detection unit according to the present invention, as described above: FIG. 10A is a plan view of the scale; and FIG. 10B is an elevation view of the scale. As shown in the figures, the electronic scale in this embodiment includes four load detection units 38 each provided at each of four corners of a platform 37. The cross section view taken along a line C—C in FIG. 10A is equivalent to that in FIG. 4, but the installation plate 5 in FIG. 4 is replaced with the platform 37.

The load detection unit 38 is installed in such manner that a holder 21 is positioned adjacent the platform 37 and a portion of the load detection unit is engaged with the platform. A lead wire 14A of a strain gauge 14 is passed through a groove in the platform 37 and is connected to an electronic circuit board provided inside a board cover 39 for calculating the load value based on the load signal detected by the strain gauge 14 and for displaying the calculation result on a display unit.

According to the configuration of the electronic scale, as described above, even if a convex half-spherical end portion of a transmission body 24 would obliquely apply the load to the projection of the load applied portion 13 as the result of the fact that the platform 30 is flexed when placing some goods, products, etc. thereon or the load detection unit is mounted to the uneven platform having irregularities, then, the sensing elements themselves can evenly receive a horizontal component of the obliquely applied load, which makes possible to minimize any fluctuation in output of the gauge caused depending on the direction in which the load is obliquely applied to the projection of the load applied portion 13, as already described with reference to the embodiment of the load detection unit.

Secondly, referring to FIG. 2 and FIGS. 4 to 14, another aspect of the present invention will be described in more detail with respect to mounting and securing of a diaphragm type load detention sensor.

Figure 11A:
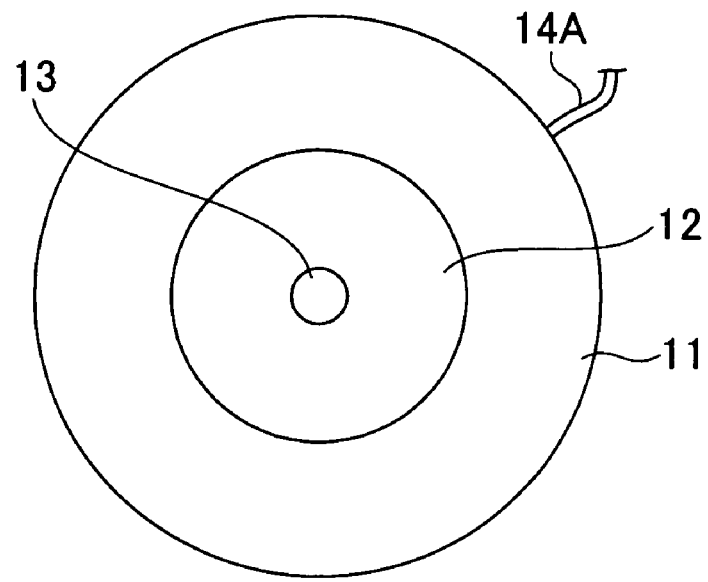
FIG. 11A is a plan view of the sensor.
Figure 11B:
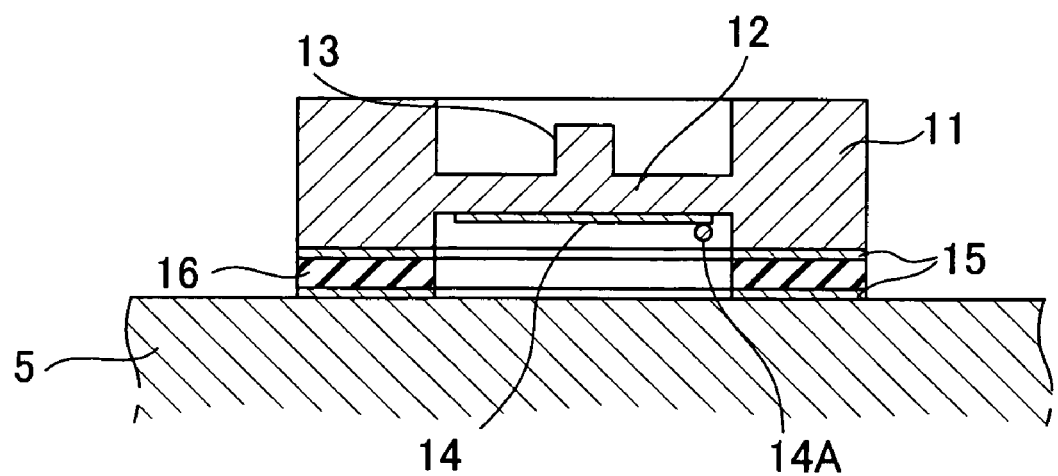
FIG. 11B is a cross section view of the sensor.

FIG. 11 is a view of a diaphragm type load detention sensor according to one embodiment of the present invention that is attached to an installation plate, i.e. a base of a scale: FIG. 11A is a plan view of the sensor; and FIG. 11B is a cross section view of the sensor. As shown in the figures, the diaphragm type load detention sensor in this embodiment comprises a mounting portion 11, a strain generation portion 12 and a load applied portion 13, wherein a strain gauge 14 including a plurality of sensing elements, as shown in FIG. 2, is affixed to the strain generation portion 12. A lead wire 14A is connected to the strain gauge 14.

As can be seen in FIG. 11B, the diaphragm type load detention sensor in this embodiment is attached to the installation plate 5 in such manner that one surface of the mounting portion 11 is affixed to the installation plate 5 by use of adhesion means such as a double-sided adhesive tape 15, etc. with a flexible resilient member 16 made of rubber, etc. interposed therebetween.

Figure 12A:
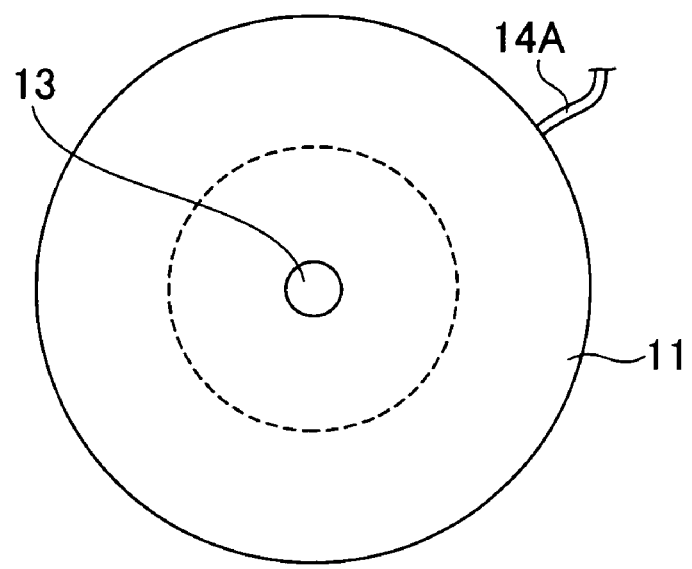
FIG. 12A is a plan view of the sensor.
Figure 12B:
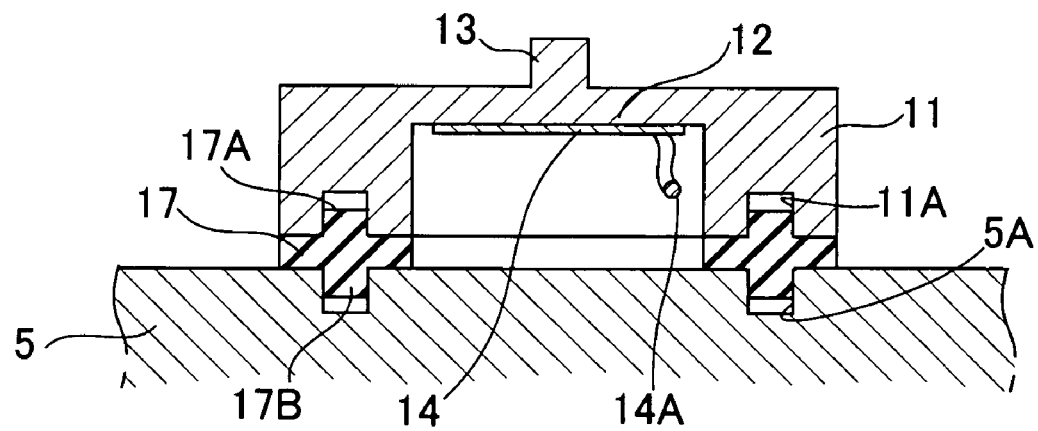
FIG. 12B is a cross section view of the sensor.

FIG. 12 is a view of a diaphragm type load detention sensor according to another embodiment of the present invention that is attached to an installation plate, i.e. a base of a scale: FIG. 12A is a plan view of the sensor; and FIG. 12B is a cross section view of the sensor. As shown in the figures, the diaphragm type load detention sensor in this embodiment comprises a mounting portion 11, a strain generation portion 12 and a load applied portion 13, wherein a strain gauge 14 including a plurality of sensing elements, as shown in FIG. 2, is affixed to the strain generation portion 12. A lead wire 14A is connected to the strain gauge 14.

As can be seen in FIG. 12B, the diaphragm type load detention sensor in this embodiment is attached to the installation plate 5 in such manner that one surface of the mounting portion 11 is affixed to the installation plate 5 with a flexible resilient member 17 made of rubber, etc. interposed therebetween. The flexible resilient member 17 in this embodiment is provided with annular projections 17A and 17B on both upper and lower peripheral surfaces thereof. The corresponding annular recess 11A is formed in one surface of the mounting portion 11. Furthermore, an annular recess 5A is formed in the installation plate 5 at the corresponding position. In this embodiment the annular projection 17A of the flexible resilient member 17 is inserted into the annular recess 11A of the mounting portion 11, and the annular projection 17B of the flexible resilient member 17 is inserted into the annular recess 5A of the installation plate 5, with the result that the diaphragm type load detention sensor can be secured to the installation plate 5.

In the embodiment, as described above, the flexible resilient member is interposed and affixed between the mounting portion and the installation plate by use of the adhesion means such as double-sided adhesive tape, etc., or by use of mating connection. However, the present invention is not limited to those, but it may be embodied in another way. For example, some adhesive agent or integral molding may be used for interposing and affixing the flexible resilient member between the mounting portion and the installation plate.

Figure 13A:
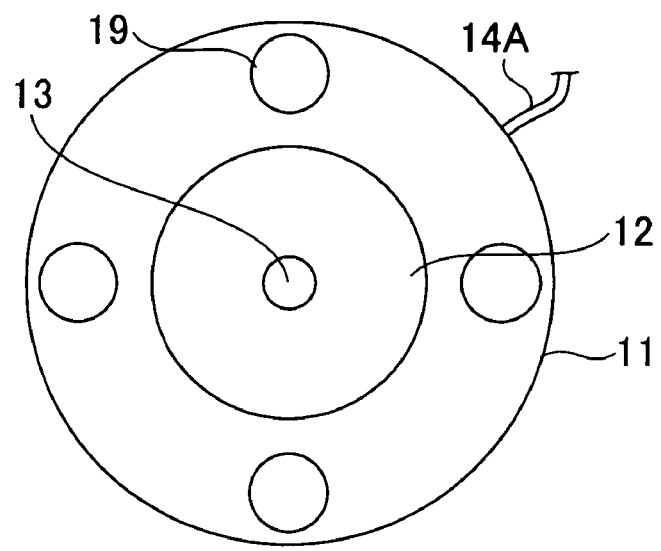
FIG. 13A is a plan view of the sensor.
Figure 13B:
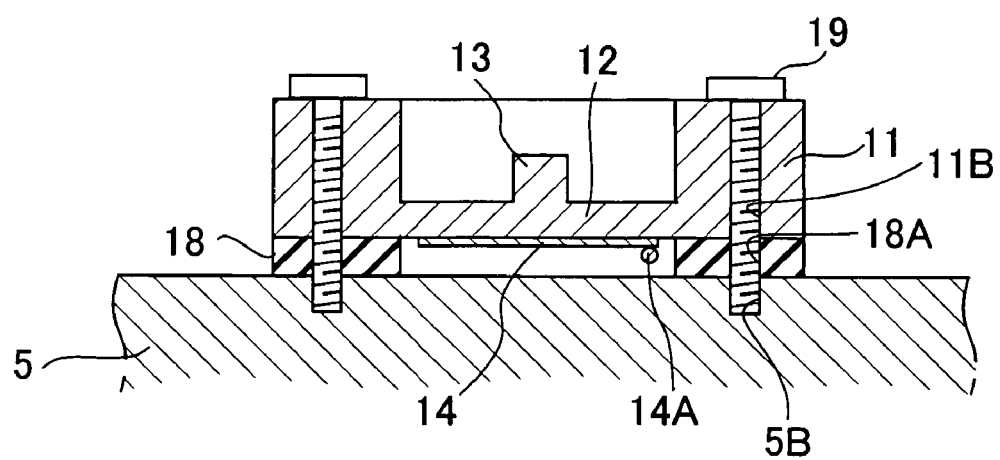
FIG. 13B is a cross section view of the sensor.

FIG. 13 is a view of a diaphragm type load detention sensor according to further embodiment of the present invention that is attached to an installation plate, i.e. a base of a scale: FIG. 13A is a plan view of the sensor; and FIG. 13B is a cross section view of the sensor. As shown in the figures, the diaphragm type load detention sensor in this embodiment comprises a mounting portion 11, a strain generation portion 12 and a load applied portion 13, wherein a strain gauge 14 including a plurality of sensing elements, as shown in FIG. 2, is affixed to the strain generation portion 12. A lead wire 14A is connected to the strain gauge 14.

As can be seen in FIG. 13B, the diaphragm type load detention sensor in this embodiment is attached to the installation plate 5 in such manner that one surface of the mounting portion 11 is affixed to the installation plate 5 with a flexible resilient member 18 made of rubber, etc. interposed therebetween. In this embodiment four through-holes 18A each for passing a fastening screw 19 therethrough are provided at four positions on the periphery of the flexible resilient member 18. Correspondingly, four through-holes 11B each for passing the fastening screw 19 therethrough are provided at the corresponding four positions on the periphery of the mounting portion 11. Furthermore, four threaded bores 5B are formed at the corresponding positions in the installation plate 5. In this embodiment the fastening screws 19 are screwed into the threaded bores 5B of the installation plate 5 via the through-holes 11B of the mounting portion 11 and through-holes 18A of the flexible resilient member 18, in order to secure the diaphragm type load detention sensor to the installation plate 5.

Figure 14A:
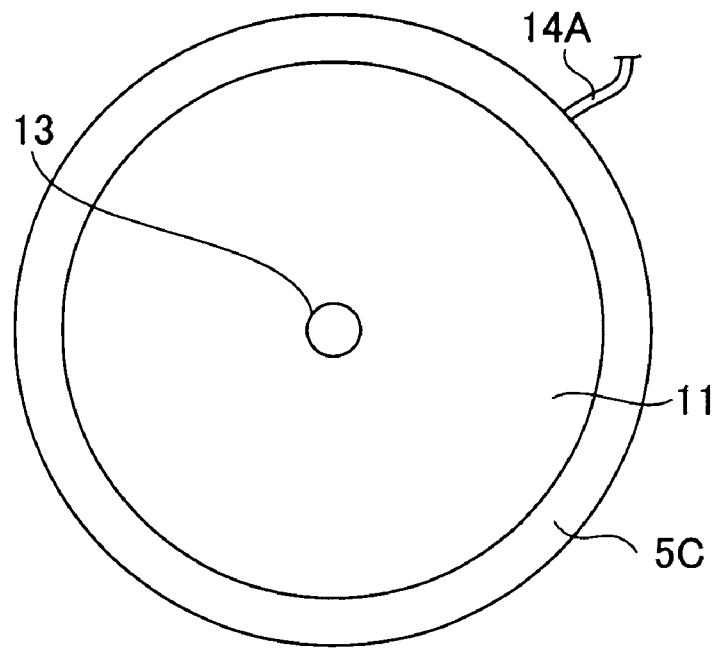
FIG. 14A is a plan view of the sensor.
Figure 14B:
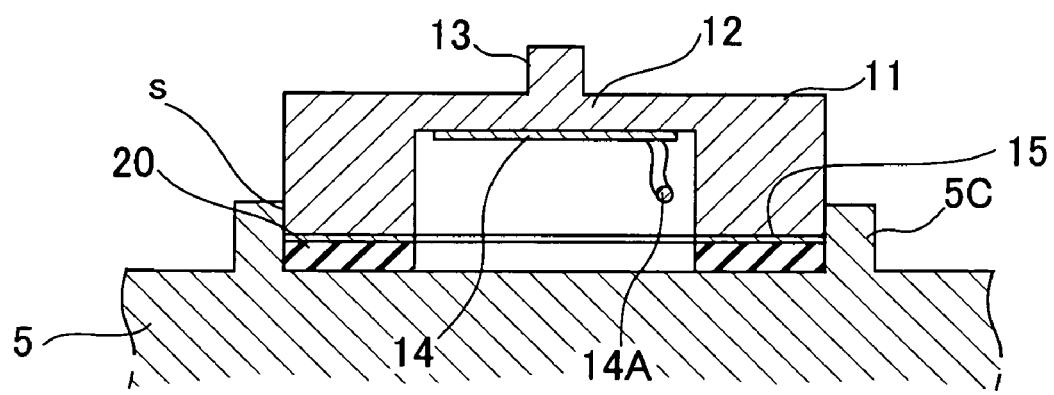
FIG. 14B is a cross section view of the sensor.

FIG. 14 is a view of a diaphragm type load detention sensor according to yet further embodiment of the present invention that is attached to an installation plate, i.e. a base of a scale: FIG. 14A is a plan view of the sensor; and FIG. 14B is a cross section view of the sensor. As shown in the figures, the diaphragm type load detention sensor in this embodiment comprises a mounting portion 11, a strain generation portion 12 and a load applied portion 13, wherein a strain gauge 14 including a plurality of sensing elements, as shown in FIG. 2, is affixed to the strain generation portion 12. A lead wire 14A is connected to the strain gauge 14.

As can be seen in FIG. 14B, the diaphragm type load detention sensor in this embodiment is attached to the installation plate 5 in such manner that one surface of the mounting portion 11 is affixed to the installation plate 5 with a flexible resilient member 20 made of rubber, etc. interposed therebetween. In this embodiment the diaphragm type load detention sensor is configured in such manner that the flexible resilient member 20 is affixed to one surface of the mounting portion 11 by use of adhesion means such as a double-sided adhesive tape 15, etc. A guide means 5C is formed at the relevant position on the installation plate 5 for receiving and guiding the flexible resilient member 20 and the lower part of the mounting portion 11. Accordingly, the diaphragm type load detention sensor can be secured to the installation plate 5. The boundary "s" between the guide means 5C and the lower part of the mounting portion 11 has a narrower clearance enough to allow slide movement therebetween. It is only necessary that at least one portion of the flexible resilient member 20 is received within the guide means 5C. In this embodiment the flexible resilient member 20 is affixed to the installation plate using the adhesion means such as the double-sided adhesive tape, etc., as described above. However, the present invention may be embodied in any other way. For example, some adhesive agent or integral molding may be used for affixing or providing the flexible resilient member 20 on the mounting portion.

In each of the embodiments, as described above, it is only necessary that the flexible resilient member is provided on at least one portion of the predetermined one surface (i.e. one surface of the mounting portion in the embodiments as above) of the diaphragm type load detention sensor in order to lift the diaphragm type load detention sensor as a whole from the installation plate when it is installed on the installation plate.

The load applied portion has the projection formed thereon for minimizing any effect to the strain generation portion, as described above. However, the strain generation portion may be recessed.

According to the configuration, as described above, even if a load is obliquely applied to the load applied portion, any variation in the boundary area between the mounting portion and the installation plate is restored to maintain the restricting condition due to the presence of the flexible resilient member, thereby preventing any fluctuation in output depending on the direction in which the load is obliquely applied from occurring.

Moreover, according to the configuration, as described above, even if any deformation is occurred in the installation plate as the result of applying a load to the load applied portion, any variation in the boundary area between the mounting portion and the installation plate due to such deformation in the installation plate is absorbed by the flexible resilient member to maintain the restricting condition, thereby allowing detection of only load component exerted to the diaphragm type load detention sensor.

FIG. 4 is a view of a load detection unit according to one embodiment of the present invention which is installed to an installation plate such as a platform of a scale: FIG. 4A is a schematic cross section view of the unit; and FIG. 4B is a bottom view of the unit. As shown in the figures, the load detection unit comprises the diaphragm type load detection sensor of the present invention, as described with reference to FIGS. 11 to 14. As shown in FIG. 4A, the diaphragm type load detection sensor comprises the mounting portion 11, the strain generation portion 12, and the load applied portion 13, wherein the strain gauge 14 including a plurality of sensing elements is affixed to the strain generation portion 12. The strain gauge 14 has a lead wire 14a connected thereto. The lead wire 14a runs through a groove 5D in the installation plate 5 and connects to any load detection circuit (not shown).

The load detection unit in this embodiment further comprises: a first flexible resilient member 16; a case made up of a holder 21 and a sensor cover 22; a transmission assembly made up of a leg 29, a transmission body 24, a second flexible resilient member 25 and a screw 26; and a support member 23. In particular, the first flexible resilient member 16 and the second flexible resilient member 25 are formed from any rubber material, for example, and the support member 23 is formed from any leaf spring, for example, as is described latter.

The holder 21 is combined with the diaphragm type load detection sensor through the first flexible resilient member 16 therebetween by latching a pawl 21A on the holder 21 to the mounting portion 11. The first flexible resilient member 16 is provided in at least any partial area between a flat surface "h" of the holder 21 and one surface "k" of the mounting portion 11 so that the entire diaphragm type load detection sensor is lifted off the flat surface "h" of the holder 21. A boundary "a" between the holder 21 and the mounting portion 11 is provided with narrower clearance that makes possible slide movement between the holder 21 and the mounting portion 11.

The sensor cover 22 is permanently coupled to the outer periphery of the support member 23, as indicated at "27". However, the transmission body 24 is not permanently coupled to the inner periphery of the support member 23, as indicated at "28". In other word, they are freely coupled to each other.

FIG. 5 is a plan view illustrating the support member 23 in more detail. As shown in FIG. 5, the support member 23 is formed from any spring plate blank by stamping to have an outer peripheral strip 23A, an inner peripheral strip 23B, and a plurality of flexible strips 23C for coupling therebetween (which are capable of flexing in any direction angled to the vertical direction as well). Reference character "23D" represents an opening caused by stamping the blank. The flexible strips 23C can be flexed according to movement of the transmission body 24 in not only vertical direction, but also in any direction angled to the vertical direction.

Although not specifically shown, the sensor cover 22 and the holder 21 are latched to each other by any suitable pawl formed thereon.

The transmission body 24 extends to outside of the sensor cover 22 and it is coupled by the screw 26 to the leg 29 on which the second flexible resilient member 25 is provided. A convex end portion (in the form of a half sphere) of the transmission body 24 freely abuts the concave end portion (also in the form of a half sphere) of the load applied portion 13. The clearance "b" between the sensor cover 22 and the leg 29, and the clearance "c" between the sensor cover 22 and the transmission body 24 are set to any value in the allowable range within which the transmission assembly is allowed to move (or in other words, any of the flexible strips causes no plastic deformation). If the transmission assembly tries to move beyond such allowable range then the sensor cover 22 would abut the leg 29 or the transmission body 24, thereby preventing the transmission assembly from excessively moving.

The load detection unit is assembled in such manner that the holder 21 is attached to the installation plate such as the cover of a scale and the leg 29 is placed on the foundation such as a floor, for example.

According to the configuration, as in the case of the load detection sensor, as described above, even if a load is obliquely applied to the load applied portion, any variation in the boundary area between the mounting portion and the installation plate is restored to maintain the restricting condition due to the presence of the flexible resilient member, thereby preventing any fluctuation in output depending on the direction in which the load is obliquely applied from occurring. Furthermore, even if any deformation is occurred in the installation plate as the result of applying a load to the load applied portion, any variation in the boundary area between one surface "k" of the mounting portion 11 and a flat surface "h" of the holder 21 due to such deformation in the installation plate is absorbed by the first flexible resilient member 16 to maintain the restricting condition, thereby allowing detection of only load component exerted to the diaphragm type load detention sensor.

The end portion of the load applied portion 13 is coupled to the end portion of the transmission body 24 with some freedom. Therefore, even if any eccentric force is transmitted from the center of the transmission assembly due to any irregularity or slanting in the place where the load detection unit is installed, such force is not exerted to the load applied portion 13, with the result that the load can be detected with higher precession.

FIG. 6 is a plan view partially broken for illustrating one embodiment of an electronic scale incorporating the diaphragm type load detection sensor according to the present invention, as described above. FIG. 7 is a cross section view of the electronic scale, taken along a line A—A in FIG. 6. As shown in the figures, the electronic scale in this embodiment is a commonly known popular type weight meter for home use (mainly including a platform 30, a base 31, levers 32, a diaphragm type load detection sensor 33, a display unit 34, etc.). In this embodiment the diaphragm type load detection sensor 33 of the present invention is provided on a force point 32B (i.e. a point to which a force is applied to balance against the load on a load acting point 32A) of the lever 32. The force point 32B is configured to have a conical shape, and a reference character "32C" in FIG. 6 represents a furculum of the lever 32.

As shown in the cross section view of FIG. 7, the diaphragm type load detection sensor 33 is positioned on the base 31 with the aid of a guide 31A that is stamped and formed in the base 31 and with a flexible resilient member 20 made of rubber, etc., interposed therebetween. The projection of the load applied portion 13 is formed to have a conical recess into which the apex of the force point 32A of the lever 32 is inserted. A lead wire 14A of the strain gauge 14 is passed through a hole in the mounting portion 11 and is connected to an electronic circuit board 35 for calculating the load value based on the load signal detected by the strain gauge 14 and for displaying the calculation result on a display unit 34.

FIG. 8 is a plan view illustrating another embodiment of an electronic scale incorporating the diaphragm type load detection sensor according to the present invention, as described above. FIG. 9 is a cross section view of the electronic scale, taken along a line B—B in FIG. 8. As shown in the figures, the electronic scale in this embodiment includes four diaphragm type load detection sensors 36 each provided at each of four corners between a base 31 and a platform 30.

The load detection sensor 36 is disposed in such manner that a bottom surface of a mounting portion 11 is affixed, by a double-sided adhesive tape 15, to a base 31 with a flexible resilient member 16 interposed therebetween, and a convex half-spherical end portion of a load applied portion 13 abuts a concave half-spherical receive portion 30A of the platform 30. In this embodiment a leg 31B is positioned immediately beneath the load applied portion 13 in order to minimize any effect of flexure of the base 31. However, the present invention is not limited to such configuration.

According to the configuration of the electronic scale, as described above, even if a load is obliquely applied to the load applied portion 13, any variation in the boundary area between the mounting portion 11 and the base 31 is restored to maintain the restricting condition due to the presence of the flexible resilient member 20, thereby preventing any fluctuation in output depending on the direction in which the load is obliquely applied from occurring.

Furthermore, according to the configuration of the electronic scale, as described above, even if any deformation is occurred in the base 31 as the result of applying a load to the load applied portion 13, any variation in the boundary area between the mounting portion 11 and the base 31 due to such deformation in base 31 is absorbed by the flexible resilient member 16 or 20 to maintain the restricting condition, thereby allowing detection of only load component exerted to the diaphragm type load detention sensor 33 or 36.

FIG. 10 is a view illustrating one embodiment of an electronic scale incorporating the load detection unit according to the present invention, as described above: FIG. 10A is a plan view of the scale; and FIG. 10B is an elevation view of the scale. As shown in the figures, the electronic scale in this embodiment includes four load detection units 38 each provided at each of four corners of a platform 37. The cross section view taken along a line C—C in FIG. 10A is equivalent to that in FIG. 4, but the installation plate 5 in FIG. 4 is replaced with the platform 37.

The load detection unit 38 is installed in such manner that a holder 21 is positioned adjacent the platform 37 and a portion of the load detection unit is engaged with the platform. A lead wire 14A of a strain gauge 14 is passed through a groove in the platform 37 and is connected to an electronic circuit board provided inside a board cover 39 for calculating the load value based on the load signal detected by the strain gauge 14 and for displaying the calculation result on a display unit.

According to the configuration of the electronic scale, as in the case of the load detection sensor, as described above, even if a load is obliquely applied to the load applied portion, any variation in the boundary area between one surface "k" of the mounting portion 11 and a flat surface "h" of the holder 21 is restored to maintain the restricting condition due to the presence of the flexible resilient member 16, thereby preventing any fluctuation in output depending on the direction in which the load is obliquely applied from occurring. Furthermore, even if any deformation is occurred in the platform 37 as the result of applying a load to the load applied portion, any variation in the boundary area between one surface "k" of the mounting portion 11 and the flat surface "h" of the holder 21 due to such deformation in the platform 37 is absorbed by the first flexible resilient member 16 to maintain the restricting condition, thereby allowing detection of only load component exerted to the diaphragm type load detention sensor.

The end portion of the load applied portion 13 is coupled to the end portion of the transmission body 24 with some freedom. Therefore, even if any eccentric force is transmitted from the center of the transmission assembly due to any irregularity in or slanting of the installation plate on which the load detection unit is mounted, such force is not exerted to the load applied portion 13, with the result that the load can be detected with higher precession.

Thirdly, referring to FIGS. 5, 6, 8, 10, 15 to 20, further aspect of the present invention will be described in more detail with respect to positioning and layout of sensing elements and terminals on a strain gauge for diaphragm.

Figure 15:
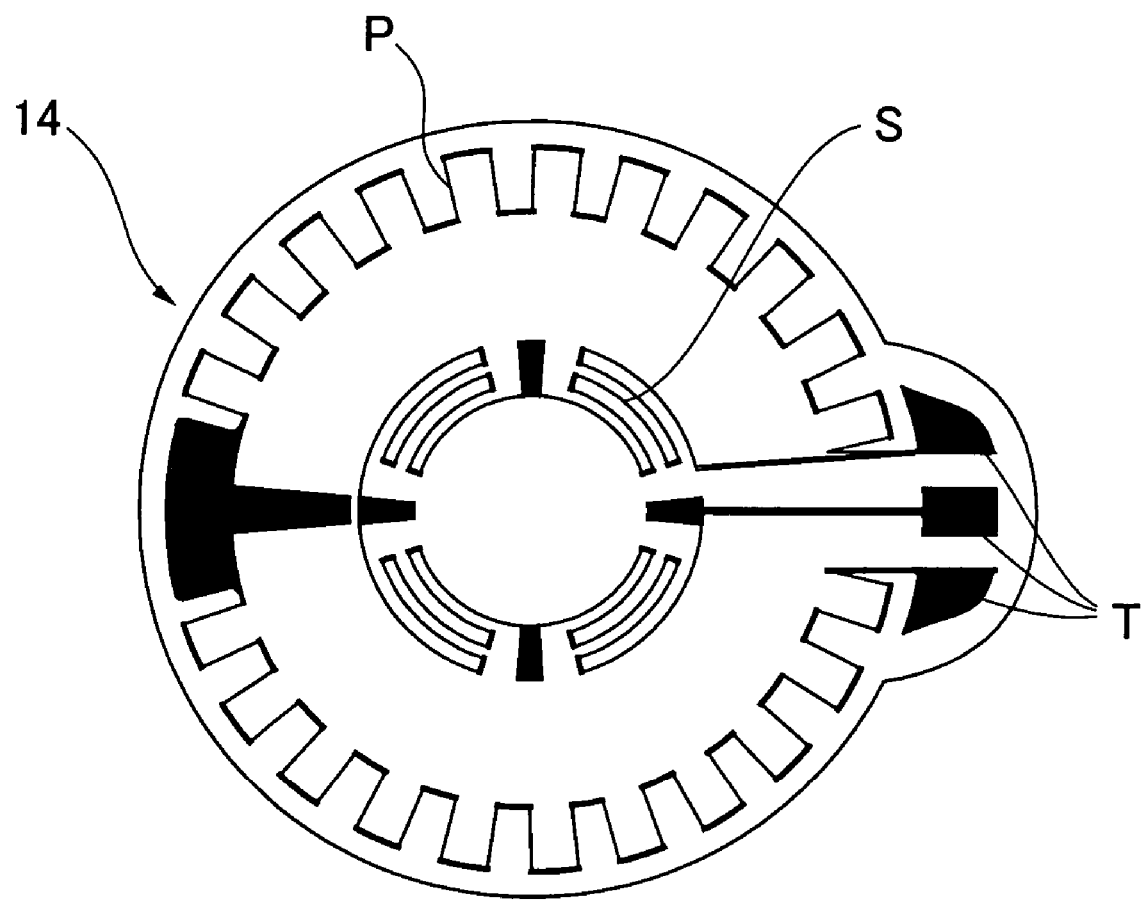
FIG. 15 is a plan view of a strain gauge for diaphragm according to one embodiment of the present invention.

FIG. 15 is a plan view of a strain gauge for diaphragm according to one embodiment of the present invention. As shown, the strain gauge 14 in this embodiment comprises sensing elements "S" and "P" that are evenly provided on substantially whole periphery thereof, except for one portion, and positioned at the predetermined distances from the center axis thereof. It further comprises terminals "T" that are provided outside the sensing element "P". In this embodiment the sensing element "S" is disposed in such pattern that receives any strain in peripheral direction, but in another embodiment it may be disposed in different pattern that receives any strain in radial direction. On the other hand, in this embodiment, the sensing element "P" is disposed in such pattern that receives any strain in radial direction, but it may be disposed in different pattern that receives any strain in peripheral direction.

According to such configuration of the strain gauge 14, it is possible to affix the sensing elements "S" and "P" on the strain generation portion (that is deformed in response to a load applied to the load applied portion) and the terminals "1" on the mounting portion (that is not deformed in response to a load applied to the load applied portion) depending on the design of diaphragm (comprising the mounting portion, the strain generation portion and the load applied portion) on which the strain gauge 14 is affixed.

Therefore, there is substantially no possibility for the terminals "T" to provide undefined resistance change or peering of solder, which can minimize degradation in performance or occurrence of fault.

Figure 16A:
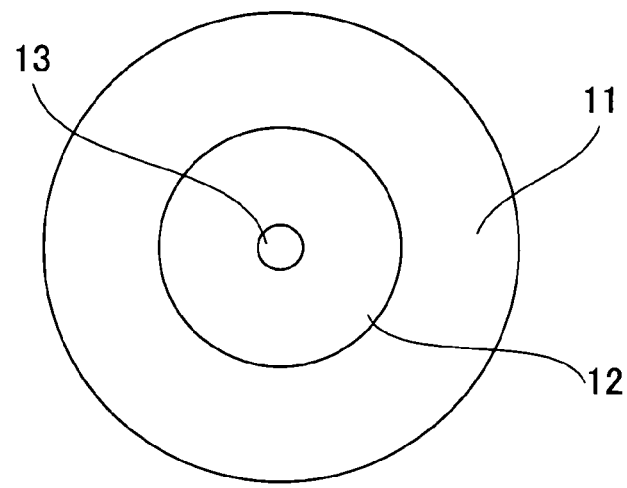
FIG. 16A is a plan view of the sensor.
Figure 16B:
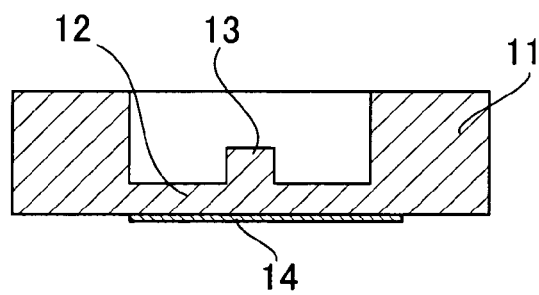
FIG. 16B is a cross section view of the sensor.
Figure 16C:
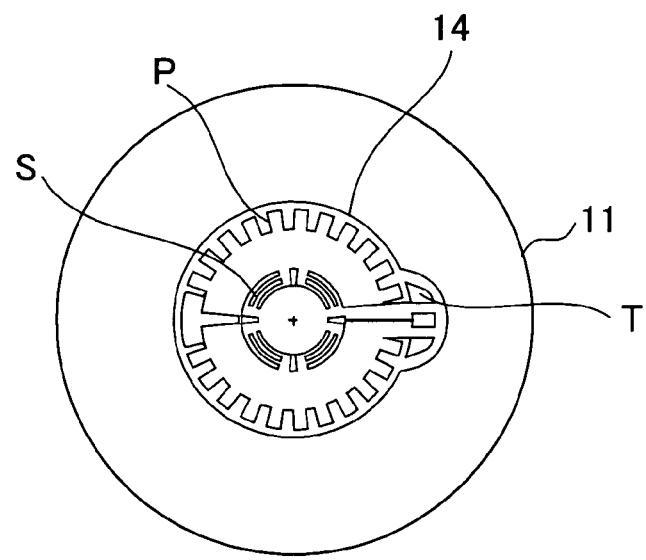
FIG. 16C is a bottom view of the sensor.

FIG. 16 is a view of a diaphragm type load detention sensor according to one embodiment of the present invention incorporating the strain gauge for diaphragm in FIG. 15: FIG. 16A is a plan view of the sensor; FIG. 16B is a cross section view of the sensor; and FIG. 16C is a bottom view of the sensor. As shown in the figures, the diaphragm type load detention sensor in this embodiment comprises a mounting portion 11, a strain generation portion 12, and a load applied portion 13, wherein a strain gauge 14 for diaphragm, as shown in FIG. 15, is affixed to such side of the strain generation portion 12 that is opposite to the load applied portion 13. As shown in FIG. 16C, the strain gauge 14 for diaphragm is mounted in such manner that the sensing elements "S" and "P" are affixed on the strain generation portion 12 and the terminals "T" are affixed on the mounting portion 11.

Figure 17A:
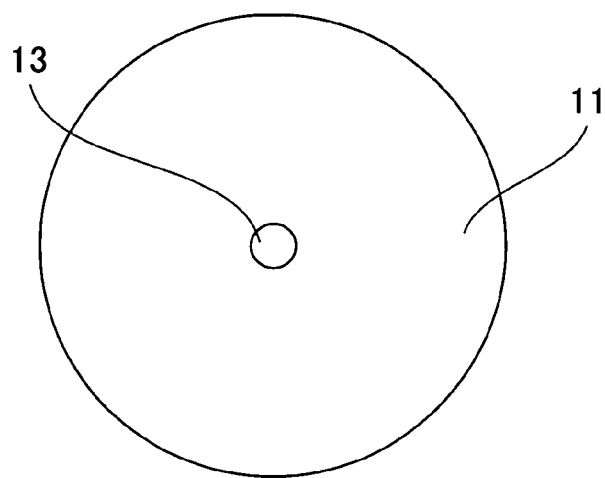
FIG. 17A is a plan view of the sensor.
Figure 17B:
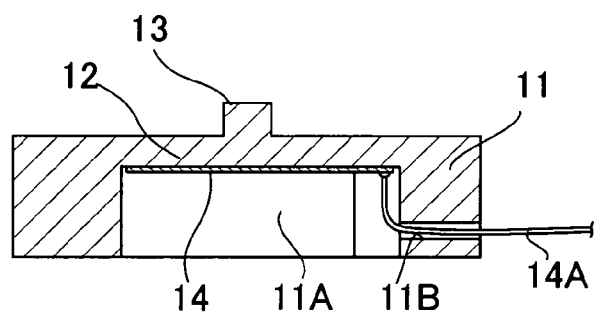
FIG. 17B is a cross section view of the sensor.
Figure 17C:
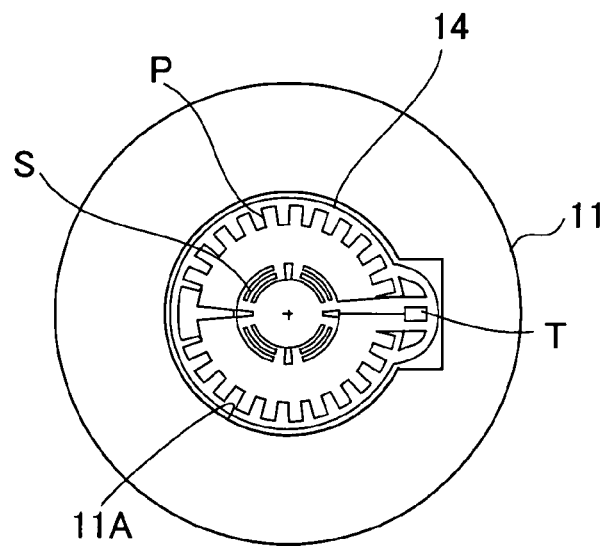
FIG. 17C is a bottom view of the sensor.

FIG. 17 is a view of a diaphragm type load detention sensor according to another embodiment of the present invention incorporating the strain gauge for diaphragm in FIG. 15: FIG. 17A is a plan view of the sensor; FIG. 17B is a cross section view of the sensor; and FIG. 17C is a bottom view of the sensor. As shown in the figures, the diaphragm type load detention sensor in this embodiment comprises a mounting portion 11, a strain generation portion 12, and a load applied portion 13, wherein a strain gauge 14 for diaphragm, as shown in FIG. 15, is affixed to such side of the strain generation portion 12 that is opposite to the load applied portion 13, and in particular, to an upper surface of a recess 11A formed in the mounting portion 11. As shown in FIG. 17C, the strain gauge 14 for diaphragm is mounted in such manner that the sensing elements "S" and "P" are affixed on the strain generation portion 12 and the terminals "T" are affixed on the mounting portion 11. A lead wire 14A soldered to the terminal "T" runs via a through-hole 11B in the mounting portion 11.

According to the configuration of the diaphragm type load detention sensor, as described above, when a load is applied to the load applied portion 13 the load only acts to the sensing elements "S" and "P" positioned on the strain generation portion 12 that is deformed in response to such load, but it does not act to the terminals "T" positioned on the mounting portion 11 that is not deformed in response to such load.

Therefore, there is substantially no possibility for the terminals "T" to provide undefined resistance change or peering of solder, which can minimize degradation in performance or occurrence of fault.

Figure 18A:
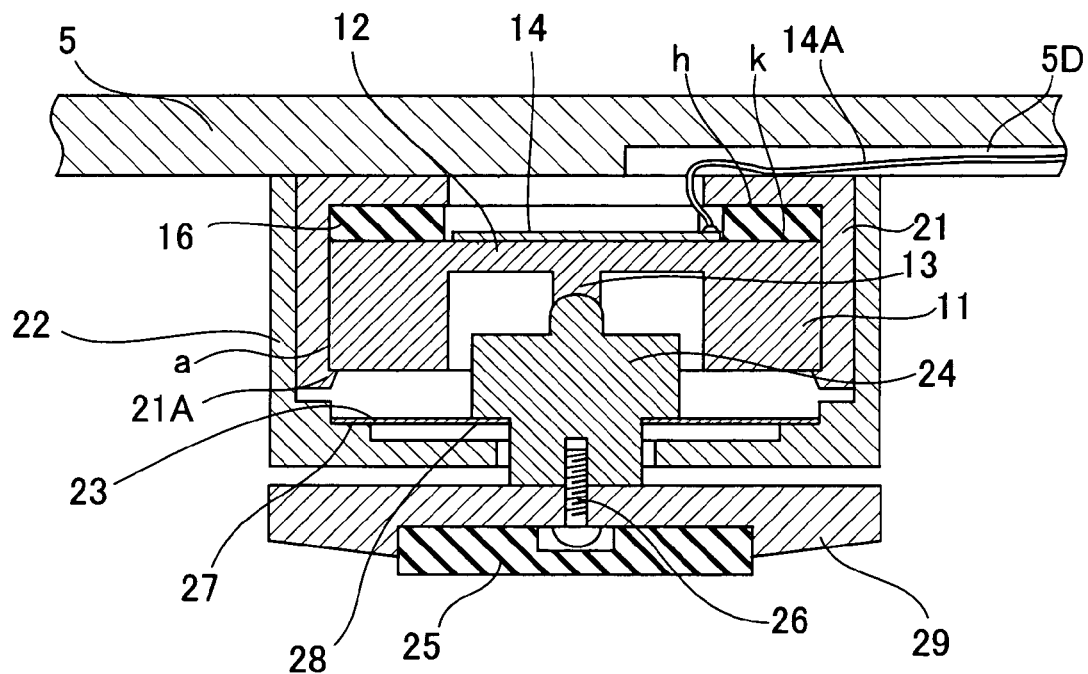
FIG. 18A is a schematic cross section view of the unit.
Figure 18B:
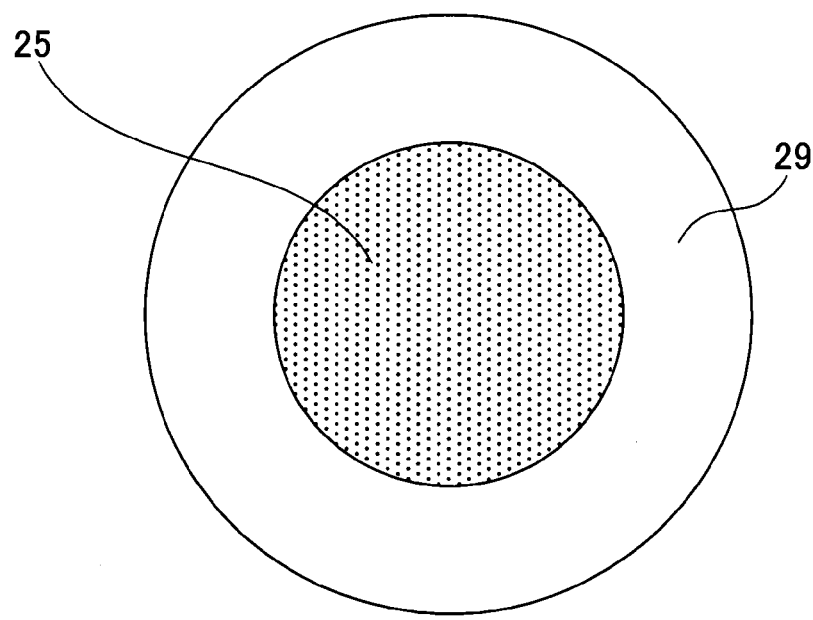
FIG. 18B is a bottom view of the unit.

FIG. 18 is a view of a load detection unit according to one embodiment of the present invention which is installed to an installation plate such as a platform of a scale: FIG. 18A is a schematic cross section view of the unit; and FIG. 18B is a bottom view of the unit. As shown in the figures, the load detection unit comprises the diaphragm type load detection sensor of the present invention, as described with reference to FIG. 16. As shown in FIG. 18A, the diaphragm type load detection sensor comprises the mounting portion 11, the strain generation portion 12, and the load applied portion 13, wherein the strain gauge 14, as shown in FIG. 15, is affixed to the strain generation portion 12. The strain gauge 14 has a lead wire 14a connected thereto. The lead wire 14a runs through a groove 5D in the installation plate 5 and connects to any load detection circuit (not shown). The projection of the load applied portion 13 is provided with a recess in the form of a half sphere.

The load detection unit in this embodiment further comprises: a first flexible resilient member 16; a case made up of a holder 21 and a sensor cover 22; a transmission assembly made up of a leg 29, a transmission body 24, a second flexible resilient member 25 and a screw 26; and a support member 23. In particular, the first flexible resilient member 16 and the second flexible resilient member 25 are formed from any rubber material, for example, and the support member 23 is formed from any leaf spring, for example, as is described latter.

The holder 21 is combined with the diaphragm type load detection sensor through the first flexible resilient member 16 therebetween, except for the terminals "T" for the strain gauge 14 on the mounting portion 11, by latching a pawl 21A of the holder 21 to the mounting portion 11. The first flexible resilient member 16 is provided in at least any partial area between a flat surface "h" of the holder 21 and one surface "k" of the mounting portion 11 so that the entire diaphragm type load detection sensor is lifted off the flat surface "h" of the holder 21. A boundary "a" between the holder 21 and the mounting portion 11 is provided with narrower clearance that makes possible slide movement between the holder 21 and the mounting portion 11. In this embodiment the first flexible resilient member 16 is provided, as described above, but it is not necessary.

The sensor cover 22 is permanently coupled to the outer periphery of the support member 23, as indicated at "27". However, the transmission body 24 is not permanently coupled to the inner periphery of the support member 23, as indicated at "28". In other word, they are freely coupled to each other.

FIG. 5 is a plan view illustrating the support member 23 in more detail. As shown in FIG. 5, the support member 23 is formed from any spring plate blank by stamping to have an outer peripheral strip 23A, an inner peripheral strip 23B, and a plurality of flexible strips 23C for coupling therebetween (which are capable of flexing in any direction angled to the vertical direction as well). Reference character "23D" represents an opening caused by stamping the blank. The flexible strips 23C can be flexed according to movement of the transmission body 24 in not only vertical direction, but also in any direction angled to the vertical direction.

Although not specifically shown, the sensor cover 22 and the holder 21 are latched to each other by any suitable pawl formed thereon.

The transmission body 24 extends to outside of the sensor cover 22 and it is coupled by the screw 26 to the leg 29 on which the second flexible resilient member 25 is provided. A convex end portion (in the form of a half sphere) of the transmission body 24 freely abuts the concave end portion (also in the form of a half sphere) of the load applied portion 13. The clearance "b" between the sensor cover 22 and the leg 29, and the clearance "c" between the sensor cover 22 and the transmission body 24 are set to any value in the allowable range within which the transmission assembly is allowed to move (or in other words, any of the flexible strips causes no plastic deformation). If the transmission assembly tries to move beyond such allowable range then the sensor cover 22 would abut the leg 29 or the transmission body 24, thereby preventing the transmission assembly from excessively moving.

The load detection unit is assembled in such manner that the holder 21 is attached to the installation plate such as the cover of a scale and the leg 29 is placed on the foundation such as a floor, for example.

According to the configuration of the load detection unit, as described above, when a load is applied to the load applied portion via the transmission assembly the load only acts to the sensing elements "S" and "P" positioned on the strain generation portion 12 that is deformed in response to such load, but it does not act to the terminals "T", positioned on the mounting portion that is not deformed in response to such load.

Therefore, there is substantially no possibility for the terminals "T" to provide undefined resistance change or peering of solder, which can minimize degradation in performance or occurrence of fault.

FIG. 6 is a plan view partially broken for illustrating one embodiment of an electronic scale incorporating the diaphragm type load detection sensor according to the present invention, as described above with reference to FIG. 17. FIG. 7 is a cross section view of the electronic scale, taken along a line A—A in FIG. 6. As shown in the figures, the electronic scale in this embodiment is a commonly known popular type weight meter for home use (mainly including a platform 30, a base 31, levers 32, a diaphragm type load detection sensor 33, a display unit 34, etc.). In this embodiment the diaphragm type load detection sensor 33 of the present invention is provided on a force point 32B (i.e. a point to which a force is applied to balance against the load on a load acting point 32A) of the lever 32. The force point 32B is configured to have a conical shape, and a reference character "32C" in FIG. 6 represents a furculum of the lever 32.

Figure 19:
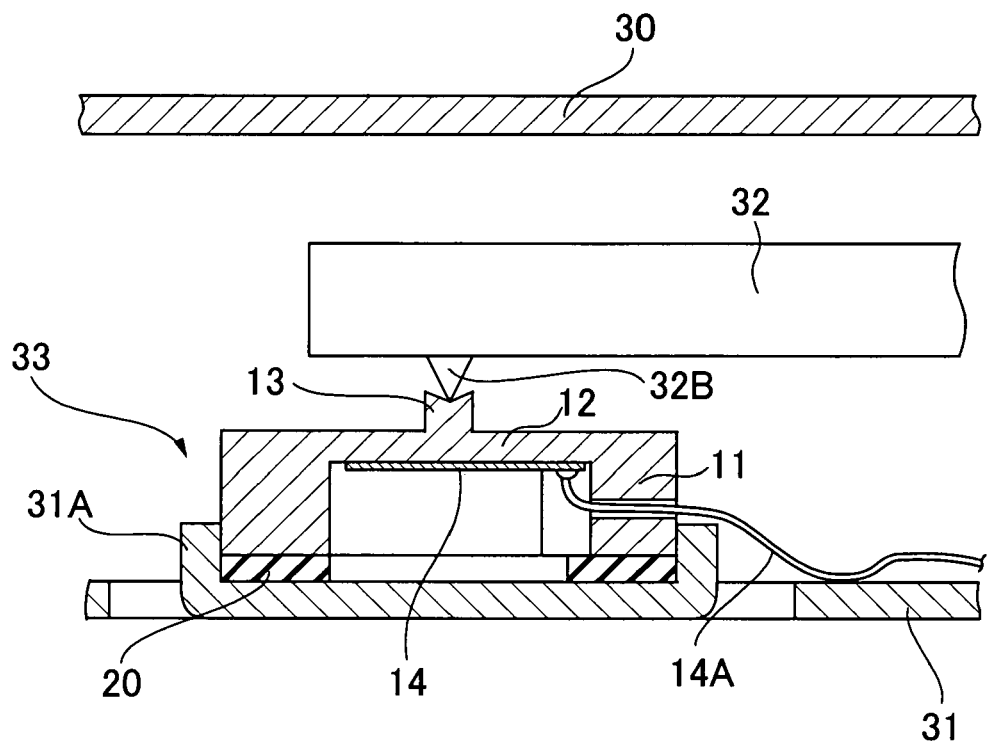
FIG. 19 is a cross section view of the electronic scale, taken along a line A—A in FIG. 6.

As shown in a cross section view of FIG. 19, the diaphragm type load detection sensor 33 is positioned on the base 31 with the aid of a guide 31A that is stamped and formed in the base 31 and with a flexible resilient member 20 made of rubber, etc., interposed therebetween (except for an area where the terminals "T" of the strain gauge 14 are provided on the mounting portion 11). The projection of the load applied portion 13 is formed to have a conical recess into which the apex of the force point 32A of the lever 32 is inserted. A lead wire 14A of the strain gauge 14 is passed through a hole in the mounting portion 11 and is connected to an electronic circuit board 35 for calculating the load value based on the load signal detected by the strain gauge 14 and for displaying the calculation result on a display unit 34. In this embodiment the flexible resilient member 20 is provided, but it is not necessarily provided in other embodiment.

Figure 20:
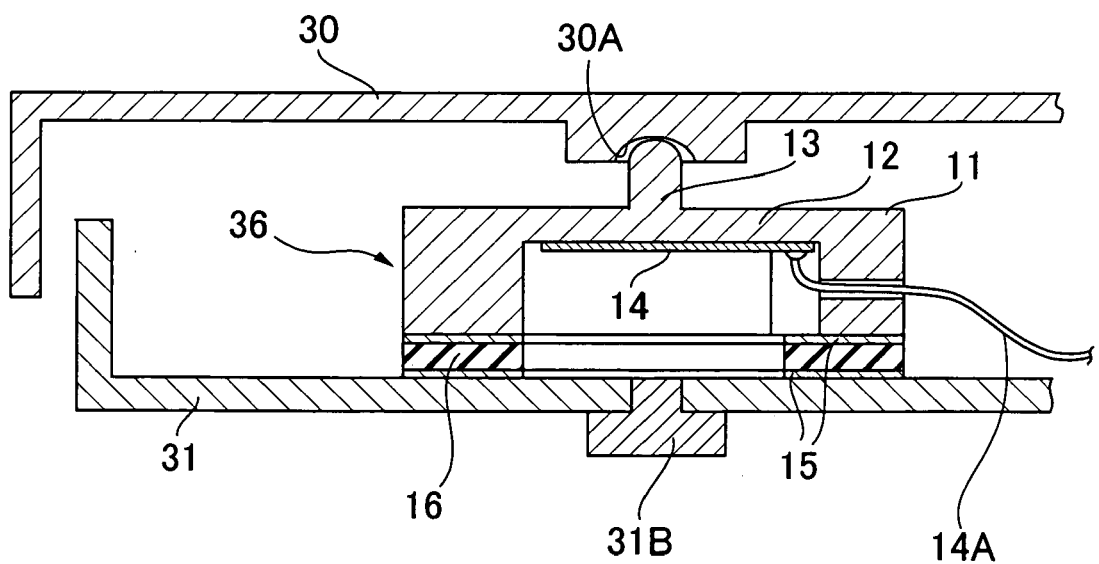
FIG. 20 is a cross section view of the electronic scale, taken along a line B—B in FIG. 8.
Figure 21A:
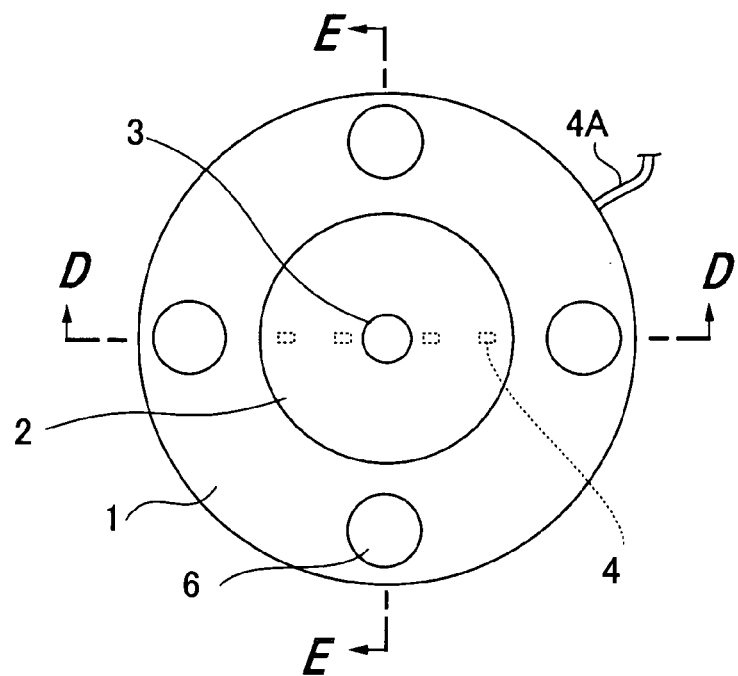
FIG. 21A is a plan view of the sensor.
Figure 21B:
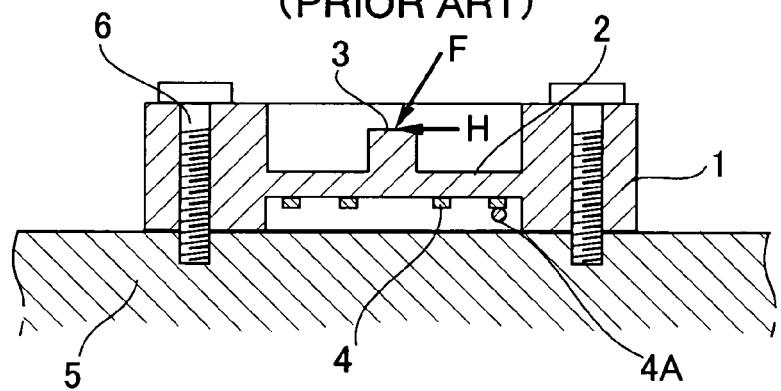
FIG. 21B is a cross section view of the sensor, taken along a line D—D in FIG. 21A.
Figure 21C:
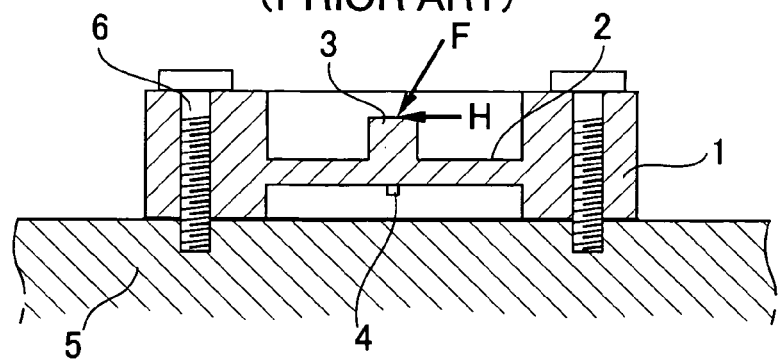
FIG. 21C is a cross section view of the sensor, taken along a line E—E in FIG. 21A.
Figure 22:
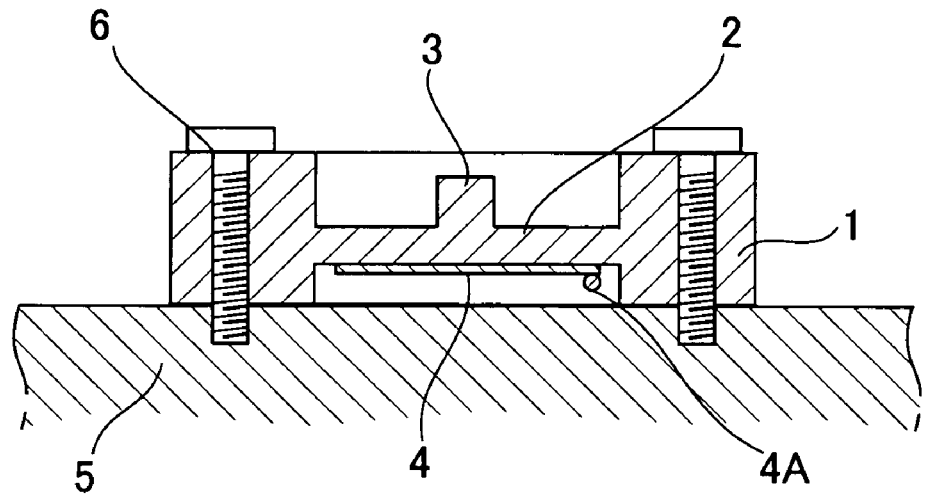
FIG. 22 is a cross section view of another diaphragm type load detection sensor in the prior art.
Figure 23:
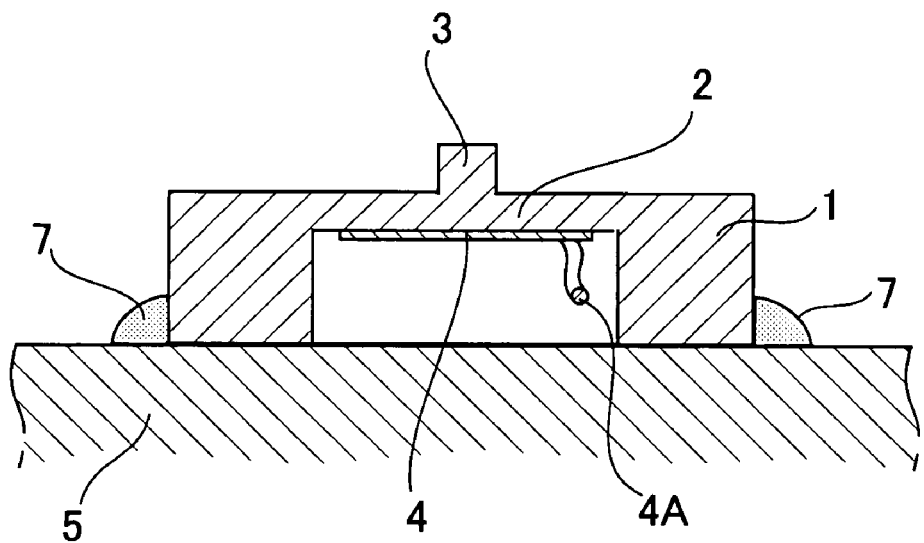
FIG. 23 is a cross section view of further diaphragm type load detection sensor in the prior art.

FIG. 8 is a plan view illustrating another embodiment of an electronic scale incorporating the diaphragm type load detection sensor according to the present invention, as described above with reference to FIG. 17. FIG. 20 is a cross section view of the electronic scale, taken along a line B—B in FIG. 8. As shown in the figures, the electronic scale in this embodiment includes four diaphragm type load detection sensors 36 each provided at each of four corners between a base 31 and a platform 30.

The load detection sensor 36 is disposed in such manner that a mounting portion 11 is affixed, by a double-sided adhesive tape 15, to a base 31 with a flexible resilient member 16 interposed therebetween, and a convex half-spherical end portion of a load applied portion 13 abuts a concave half-spherical receive portion 30A of the platform 30. In this embodiment a leg 31B is positioned immediately beneath the load applied portion 13 in order to minimize any effect of flexure of the base 31. However, the present invention is not limited to such configuration. Furthermore, in this embodiment the flexible resilient member 16 is provided, but it is not necessarily provided in other embodiment.

According to the configuration of the electronic scale, as described above, when some good or product is put on the platform 30 to apply the load to the load applied portion the load only acts to the sensing elements "S" and "P" positioned on the strain generation portion 12 that is deformed in response to such load, but it does not act to the terminals "T" positioned on the mounting portion that is not deformed in response to such load.

Therefore, there is substantially no possibility for the terminals "T" to provide undefined resistance change or peering of solder, which can minimize degradation in performance or occurrence of fault.

FIG. 10 is a view illustrating one embodiment of an electronic scale incorporating the load detection unit according to the present invention, as described above: FIG. 10A is a plan view of the scale; and FIG. 10B is an elevation view of the scale. As shown in the figures, the electronic scale in this embodiment includes four load detection units 38 each provided at each of four corners of a platform 37. The cross section view taken along a line C—C in FIG. 10A is equivalent to that in FIG. 4, but the installation plate 5 in FIG. 4 is replaced with the platform 37.

The load detection unit 38 is installed in such manner that a holder 21 is positioned adjacent the platform 37 and a portion of the load detection unit is engaged with the platform. A lead wire 14A of a strain gauge 14 is passed through a groove in the platform 37 and is connected to an electronic circuit board provided inside a board cover 39 for calculating the load value based on the load signal detected by the strain gauge 14 and for displaying the calculation result on a display unit.

According to the configuration of the electronic scale, as described above, when some good or product is put on the platform 30 to apply the load to the load applied portion the load only acts to the sensing elements "S" and "P" positioned on the strain generation portion 12 that is deformed in response to such load, but it does not act to the terminals "T" positioned on the mounting portion that is not deformed in response to such load.

Therefore, there is substantially no possibility for the terminals "T" to provide undefined resistance change or peering of solder, which can minimize degradation in performance or occurrence of fault.

It is apparent from the foregoing that the present invention can reduce any fluctuation in output depending on the direction in which a load is obliquely applied to a projection of a load applied portion in order to maximize the precision with which a diaphragm type load detection sensor detects the load, and hence, to maximize the precision with which a load detection unit incorporating the diaphragm type load detection sensor detects the load. Accordingly, an electronic scale using the diaphragm type load detection sensor or the load detection unit can provide higher precision for measurement.

Conventional attachment means such as screwing, welding, etc. is defective in that it leads to deformation not only in a strain generation portion 2, but also in an installation plate 5 upon a load applied to the load applied portion 3. Then, the boundary between the mounting portion 1 and the installation plate 5 may be slightly shifted to change the restricting condition, thereby inversely affecting non-linearity, repeatability, and other performance characteristics. If the diaphragm comprising the mounting portion 1, the strain generation portion 2 and the load applied portion 3 is formed from different material than that of the installation plate 5 then any change in the strain generation portion 2 due to temperature change is restricted, if such temperature change occurred, because of difference in linear expansion coefficient present therebetween, thereby shifting the zero point in output.

Flexible resilient member 16 (20) provided between the mounting portion 1 and the installation plate 5 (or a base 31) according to the present invention acts to increase the precision with which the diaphragm type load detection sensor detects the load, and hence, to increase the precision with which the load detection unit incorporating the diaphragm type load detection sensor detects the load. Accordingly, an electronic scale using the diaphragm type load detection sensor or the load detection unit can provide higher precision for measurement.

Figure 24:
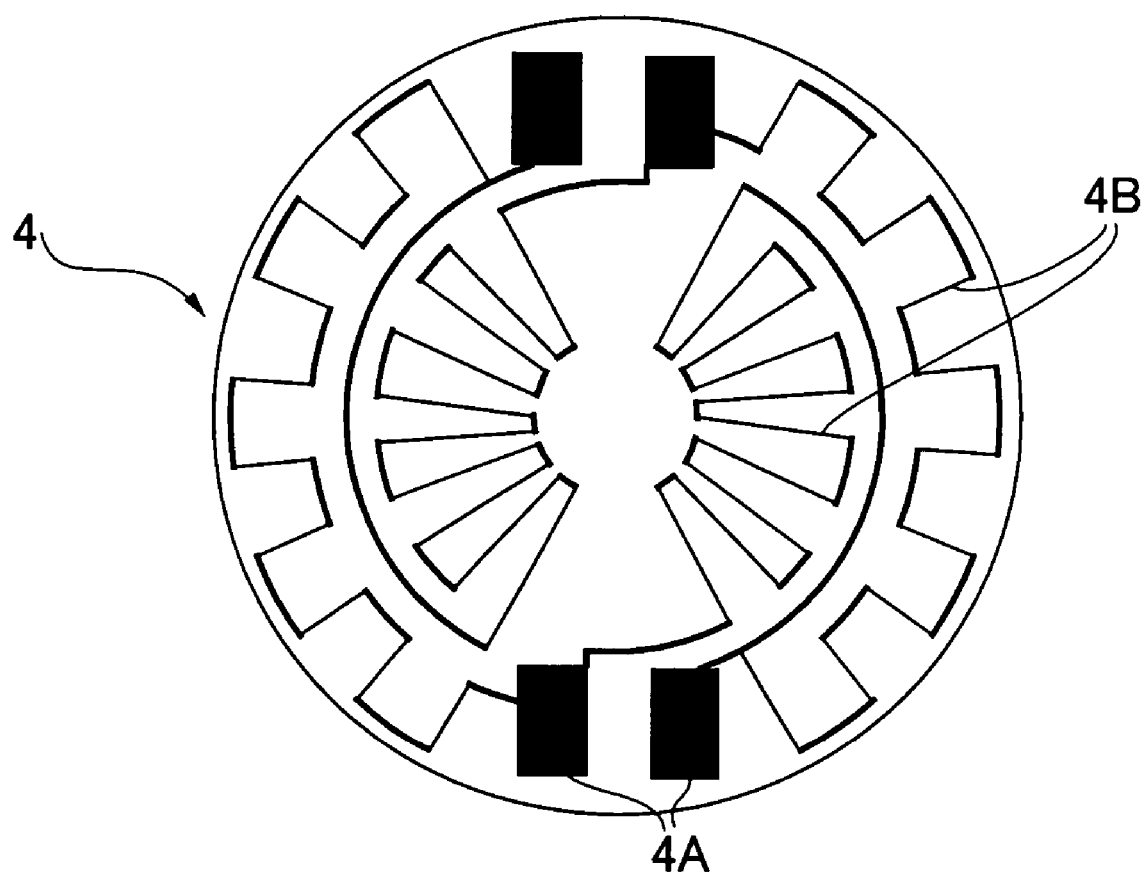
FIG. 24 is a plane view of a conventional strain gauge for diaphragm.
Figure 25A:
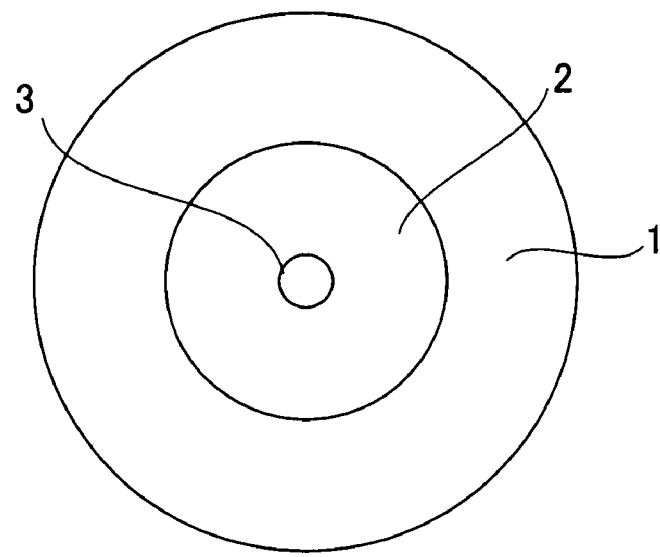
FIG. 25A is a plan view of the sensor.
Figure 25B:
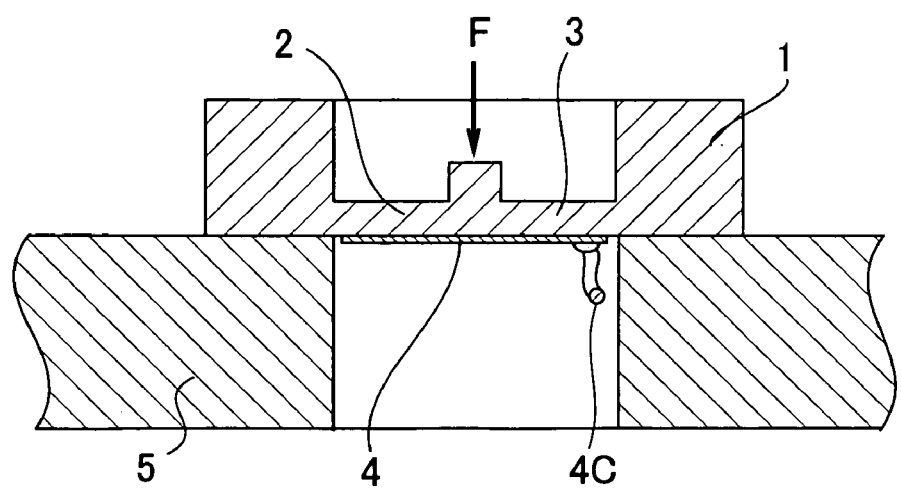
FIG. 25B is a cross section view of the sensor.

Furthermore, in the embodiment of the present invention, a conventional strain gauge 4 for diaphragm, as shown in FIG. 24, may be used for the strain gauge having a plurality of sensing elements. More particularly, the strain gauge 4 has sensing elements 4B positioned at the predetermined distances from the center thereof and terminals 4A positioned on substantially same periphery as the sensing elements 4B (refer to Patent Laid-Open No. 7-72028). However, such conventional strain gauge for diaphragm provides the following problems, if it is used in a conventional diaphragm type load detection sensor, as shown in FIG. 25. In particular, FIG. 25A is a plan view of a conventional diaphragm type load detection sensor and FIG. 25B is a cross section view of such sensor. As can be seen in FIG. 25B, the conventional strain gauge 4 for diaphragm is attached in such manner that all the sensing elements 4B and the terminals 4A are affixed to a strain generation portion 2 of the diaphragm (comprising a mounting portion 1, the strain generation portion 2 and a load applied portion 3) and a lead wire 4C is soldered to the terminal 4A. Then, the mounting portion 1 is attached to an installation plate 5 that may be a base of a scale. In such circumstances, as shown in FIG. 25B, when a load "F" is applied to the load applied portion 3 any deformation in the strain generation portion 2 may be transmitted not only to the sensing elements 4B, but also to the terminals 4A of the strain gauge 4. Accordingly, the terminals 4A may provide any possibility of small, but unstable resistance change or peering of solder.

However, according to the present invention, the terminals of the strain gauge are provided at such position that is unlikely to be affected by deformation of the strain generation portion, and therefore, it is possible to eliminate any undefined resistance change caused by the terminals and any peering of the solder, thereby lowering the possibility of performance degradation and fault. Therefore, by incorporating such strain gauge the diaphragm type load detection sensor, the load detection unit and the electronic scale having less possibility of performance degradation and fault can be provided.

What is claimed is:

1. A diaphragm type load detection sensor comprising:
a mounting portion attached to an installation plate;
a strain generation portion provided on the mounting portion and having a load applied portion formed at the center thereof to which a load to be detected is applied; and
a strain gauge provided on the strain generation portion, wherein
said strain gauge has sensing elements evenly provided on substantially a whole periphery thereof and positioned at predetermined distances from the center axis of the load applied portion of the strain generation portion;
a projection is formed on the load applied portion at the center axis thereof and said sensing elements are provided on a surface of the strain generation portion at such side that is opposite to the side where said projection is formed;
said sensing elements have a pattern wherein the sensing element is disposed to receive a strain in the peripheral direction and a pattern wherein the sensing element is disposed to receive a strain in the radial direction; and
said mounting portion is attached to the installation plate with a flexible resilient member interposed therebetween.

2. A diaphragm type load detection sensor comprising:
a mounting portion attached to an installation plate with a flexible resilient member interposed therebetween;
a strain generation portion provided on the mounting portion and having a load applied portion formed at the center thereof to which a load to be detected is applied; and
a strain gauge provided on the strain generation portion, wherein
said strain gauge has sensing elements evenly provided on substantially a whole periphery thereof and positioned at predetermined distances from the center axis of the load applied portion of the strain generation portion;
a projection is formed on the load applied portion at the center axis thereof and said sensing elements are provided on a surface of the strain generation portion at such side that is opposite to the side where said projection is formed;
said sensing elements have a pattern wherein the sensing element is disposed to receive a strain in the peripheral direction and a pattern wherein the sensing element is disposed to receive a strain in the radial direction; and
said strain gauge has terminals provided outside of the sensing elements and is disposed on the strain generation portion in such manner that said sensing elements are positioned on the strain generation portion and said terminals are positioned on the mounting portion.

3. A diaphragm type load detection sensor according to claim 1 in which said flexible resilient member is formed from rubber material.

4. A diaphragm type load detection sensor according to claim 2 in which said flexible resilient member is formed from rubber material.

5. A diaphragm type load detection sensor according to claim 1 in which said flexible resilient member is secured to the mounting portion or the installation plate with an adhesion means, an adhesive agent, a fastening screw, a guide member, a mating connection or an integral molding process.

6. A diaphragm type load detection sensor according to claim 2 in which said flexible resilient member is secured to the mounting portion or the installation plate with an adhesion means, an adhesive agent, a fastening screw, a guide member, a mating connection or an integral molding process.

7. A diaphragm type load detection sensor according to claim 3 in which said flexible resilient member is secured to the mounting portion or the installation plate with an adhesion means, an adhesive agent, a fastening screw, a guide member, a mating connection or an integral molding process.

8. A diaphragm type load detection sensor according to claim 4 in which said flexible resilient member is secured to the mounting portion or the installation plate with an adhesion means, an adhesive agent, a fastening screw, a guide member, a mating connection or an integral molding process.

9. A load detection unit comprising:
a diaphragm type load detection sensor;
a case;
a transmission assembly; and
a support member, wherein
said diaphragm type load detection sensor has a mounting portion, a strain generation portion provided on the mounting portion and a load applied portion formed at the center thereof to which a load to be detected is applied, and a strain gauge on the strain generation portion;
said case is attached to an installation plate for guiding the diaphragm type load detection sensor;
said transmission assembly transmits a load to be detected to the load applied portion of the diaphragm type load detection sensor;
said support member supports the transmission assembly on the case;
said strain gauge has sensing elements evenly provided on substantially a whole periphery thereof and positioned at predetermined distances from the center axis of the load applied portion of the strain generation portion;
a projection is formed on the load applied portion at the center axis thereof and said sensing elements are provided on a surface of the strain generation portion at such side that is opposite to the side where said projection is formed; and
said sensing elements have a pattern wherein the sensing element is disposed to receive a strain in the peripheral direction and a pattern wherein the sensing element is disposed to receive a strain in the radial direction;
the load detection unit further comprising at least one of a flexible resilient member contained in the case and interposed between the mounting portion of the diaphragm type load detection sensor and the installation plate, or another flexible resilient member provided at such side of the transmission assembly that receives a load to be detected.

10. A load detection unit comprising:
a diaphragm type load detection sensor;
a case;
a transmission assembly; and
a support member, wherein
said diaphragm type load detection sensor has a mounting portion, a strain generation portion provided on the mounting portion and a load applied portion formed at the center thereof to which a load to be detected is applied, and a strain gauge on the strain generation portion;
said case is attached to an installation plate for guiding the diaphragm type load detection sensor;
said transmission assembly transmits a load to be detected to the load applied portion of the diaphragm type load detection sensor;
said support member supports the transmission assembly on the case;
said strain gauge has sensing elements evenly provided on substantially a whole periphery thereof and positioned at predetermined distances from the center axis of the load applied portion of the strain generation portion;
a projection is formed on the load applied portion at the center axis thereof and said sensing elements are provided on a surface of the strain generation portion at such side that is opposite to the side where said projection is formed;
said sensing elements have a pattern wherein the sensing element is disposed to receive a strain in the peripheral direction and a pattern wherein the sensing element is disposed to receive a strain in the radial direction; and
said strain gauge has terminals provided outside of the sensing elements and is disposed on the strain generation portion in such manner that said sensing elements are positioned on the strain generation portion and said terminals are positioned on the mounting portion;
the load detection unit further comprising at least one of a flexible resilient member contained in the case and interposed between the mounting portion of the diaphragm type load detection sensor and the installation plate, and another flexible resilient member provided at such side of the transmission assembly that receives a load to be detected.

11. A load detection unit according to claim 9 in which said at least one of the flexible resilient member or another flexible resilient member is formed from rubber material.

12. A load detection unit according to claim 10 in which said at least one of the flexible resilient member or another flexible resilient member is formed from rubber material.

13. A load detection unit according to claim 9 in which said transmission assembly is movably coupled to the load applied portion.

14. A load detection unit according to claim 10 in which said transmission assembly is movably coupled to the load applied portion.

15. A load detection unit according to claim 11 in which said transmission assembly is movably coupled to the load applied portion.

16. A load detection unit according to claim 12 in which said transmission assembly is movably coupled to the load applied portion.

17. A load detection unit comprising:
a diaphragm type load detection sensor;
a case;

a transmission assembly; and
a support member, wherein
said diaphragm type load detection sensor has a mounting portion, a strain generation portion provided on the mounting portion and a load applied portion formed at the center thereof to which a load to be detected is applied, and a strain gauge on the strain generation portion;
said case is attached to an installation plate for guiding the diaphragm type load detection sensor;
said transmission assembly transmits a load to be detected to the load applied portion of the diaphragm type load detection sensor;
said support member supports the transmission assembly on the case;
said strain gauge has sensing elements evenly provided on substantially a whole periphery thereof and positioned at predetermined distances from the center axis of the load applied portion of the strain generation portion;
a projection is formed on the load applied portion at the center axis thereof and said sensing elements are provided on a surface of the strain generation portion at such side that is opposite to the side where said projection is formed;
said sensing elements have a pattern wherein the sensing element is disposed to receive a strain in the peripheral direction and a pattern wherein the sensing element is disposed to receive a strain in the radial direction; and
said support member is a leaf spring including an outer peripheral strip permanently coupled to the case, an inner peripheral strip freely coupled to the transmission assembly, and flexible strips for coupling therebetween.

18. A load detection unit comprising:
a diaphragm type load detection sensor;
a case;
a transmission assembly; and
a support member, wherein
said diaphragm type load detection sensor has a mounting portion, a strain generation portion provided on the mounting portion and a load applied portion formed at the center thereof to which a load to be detected is applied, and a strain gauge on the strain generation portion;
said case is attached to an installation plate for guiding the diaphragm type load detection sensor;
said transmission assembly transmits a load to be detected to the load applied portion of the diaphragm type load detection sensor;
said support member supports the transmission assembly on the case;
said strain gauge has sensing elements evenly provided on substantially a whole periphery thereof and positioned at predetermined distances from the center axis of the load applied portion of the strain generation portion;
a projection is formed on the load applied portion at the center axis thereof and said sensing elements are provided on a surface of the strain generation portion at such side that is opposite to the side where said projection is formed;
said sensing elements have a pattern wherein the sensing element is disposed to receive a strain in the peripheral direction and a pattern wherein the sensing element is disposed to receive a strain in the radial direction;
said strain gauge has terminals provided outside of the sensing elements and is disposed on the strain generation portion in such manner that said sensing elements are positioned on the strain generation portion and said terminals are positioned on the mounting portion; and
said support member is a leaf spring including an outer peripheral strip permanently coupled to the case, an inner peripheral strip freely coupled to the transmission assembly, and flexible strips for coupling therebetween.

19. A load detection unit according to claim 9 in which said support member is a leaf spring including an outer peripheral strip permanently coupled to the case, an inner peripheral strip freely coupled to the transmission assembly, and flexible strips for coupling therebetween.

20. A load detection unit according to claim 10 in which said support member is a leaf spring including an outer peripheral strip permanently coupled to the case, an inner peripheral strip freely coupled to the transmission assembly, and flexible strips for coupling therebetween.

21. A load detection unit according to claim 11 in which said support member is a leaf spring including an outer peripheral strip permanently coupled to the case, an inner peripheral strip freely coupled to the transmission assembly, and flexible strips for coupling therebetween.

22. A load detection unit according to claim 12 in which said support member is a leaf spring including an outer peripheral strip permanently coupled to the case, an inner peripheral strip freely coupled to the transmission assembly, and flexible strips for coupling therebetween.

23. A load detection unit comprising:
a diaphragm type load detection sensor;
a case;
a transmission assembly; and
a support member, wherein
said diaphragm type load detection sensor has a mounting portion, a strain generation portion provided on the mounting portion and a load applied portion formed at the center thereof to which a load to be detected is applied, and a strain gauge on the strain generation portion;
said case is attached to an installation plate for guiding the diaphragm type load detection sensor;
said transmission assembly transmits a load to be detected to the load applied portion of the diaphragm type load detection sensor;
said support member supports the transmission assembly on the case;
said strain gauge has sensing elements evenly provided on substantially a whole periphery thereof and positioned at predetermined distances from the center axis of the load applied portion of the strain generation portion;
a projection is formed on the load applied portion at the center axis thereof and said sensing elements are provided on a surface of the strain generation portion at such side that is opposite to the side where said projection is formed;
said sensing elements have a pattern wherein the sensing element is disposed to receive a strain in the peripheral direction and a pattern wherein the sensing element is disposed to receive a strain in the radial direction;
said strain gauge has terminals provided outside of the sensing elements and is disposed on the strain generation portion in such manner that said sensing elements are positioned on the strain generation portion and said terminals are positioned on the mounting portion;
said transmission assembly is movably coupled to the load applied portion; and
said support member is a leaf spring including an outer peripheral strip permanently coupled to the case, an inner peripheral strip freely coupled to the transmission assembly, and flexible strips for coupling therebetween.

24. A load detection unit according to claim 13 in which said support member is a leaf spring including an outer peripheral strip permanently coupled to the case, an inner peripheral strip freely coupled to the transmission assembly, and flexible strips for coupling therebetween.

25. A load detection unit according to claim 14 in which said support member is a leaf spring including an outer peripheral strip permanently coupled to the case, an inner peripheral strip freely coupled to the transmission assembly, and flexible strips for coupling therebetween.

26. A load detection unit according to claim 15 in which said support member is a leaf spring including an outer peripheral strip permanently coupled to the case, an inner peripheral strip freely coupled to the transmission assembly, and flexible strips for coupling therebetween.

27. A load detection unit according to claim 16 in which said support member is a leaf spring including an outer peripheral strip permanently coupled to the case, an inner peripheral strip freely coupled to the transmission assembly, and flexible strips for coupling therebetween.

28. A load detection unit according to claim 18 in which said flexible strips are plural beams formed in the direction of rotation about the center axis of the inner peripheral strip.

29. A load detection unit according to claim 19 in which said flexible strips are plural beams formed in the direction of rotation about the center axis of the inner peripheral strip.

30. A load detection unit according to claim 20 in which said flexible strips are plural beams formed in the direction of rotation about the center axis of the inner peripheral strip.

31. A load detection unit according to claim 21 in which said flexible strips are plural beams formed in the direction of rotation about the center axis of the inner peripheral strip.

32. A load detection unit according to claim 22 in which said flexible strips are plural beams formed in the direction of rotation about the center axis of the inner peripheral strip.

33. A load detection unit according to claim 23 in which said flexible strips are plural beams formed in the direction of rotation about the center axis of the inner peripheral strip.

34. A load detection unit according to claim 24 in which said flexible strips are plural beams formed in the direction of rotation about the center axis of the inner peripheral strip.

35. A load detection unit according to claim 25 in which said flexible strips are plural beams formed in the direction of rotation about the center axis of the inner peripheral strip.

36. A load detection unit according to claim 26 in which said flexible strips are plural beams formed in the direction of rotation about the center axis of the inner peripheral strip.

37. A load detection unit according to claim 27 in which said flexible strips are plural beams formed in the direction of rotation about the center axis of the inner peripheral strip.

38. An electronic scale comprising:
a diaphragm type load detection sensor;
a base;
a platform; and
a lever, wherein
said diaphragm type load detection sensor comprises: a mounting portion attached to an installation plate; a strain generation portion provided on the mounting portion and having a load applied portion formed at the center thereof to which a load to be detected is applied; and a strain gauge provided on the strain generation portion, wherein said strain gauge has sensing elements evenly provided on substantially a whole periphery thereof and positioned at predetermined distances from the center axis of the load applied portion of the strain generation portion,
said lever receives a load applied to the platform and transmits it to the load applied portion of the diaphragm type load detection sensor,
a projection is formed on the load applied portion at the center axis thereof and said sensing elements are provided on a surface of the strain generation portion at such side that is opposite to the side where said projection is formed,
said sensing elements have a pattern wherein the sensing element is disposed to receive a strain in the peripheral direction and a pattern wherein the sensing element is disposed to receive a strain in the radial direction, and
said strain gauge has terminals provided outside of the sensing elements and is disposed on the strain generation portion in such manner that said sensing elements are positioned on the strain generation portion and said terminals are positioned on the mounting portion.

39. An electronic scale comprising:
a diaphragm type load detection sensor;
a base;
a platform; and
a lever, wherein
said diaphragm type load detection sensor comprises: a mounting portion attached to an installation plate; a strain generation portion provided on the mounting portion and having a load applied portion formed at the center thereof to which a load to be detected is applied; and a strain gauge provided on the strain generation portion, wherein said strain gauge has sensing elements evenly provided on substantially a whole periphery thereof and positioned at predetermined distances from the center axis of the load applied portion of the strain generation portion,
said lever receives a load applied to the platform and transmits it to the load applied portion of the diaphragm type load detection sensor,
a projection is formed on the load applied portion at the center axis thereof and said sensing elements are provided on a surface of the strain generation portion at such side that is opposite to the side where said projection is formed,
said sensing elements have a pattern wherein the sensing element is disposed to receive a strain in the peripheral direction and a pattern wherein the sensing element is disposed to receive a strain in the radial direction, and
said mounting portion is attached to the installation plate with a flexible resilient member interposed therebetween.

40. An electronic scale according to claim 38 in which said mounting portion is attached to the installation plate with a flexible resilient member interposed therebetween.

41. An electronic scale according to claim 24 in which said flexible resilient member is formed from rubber material.

42. An electronic scale according to claim 40 in which said flexible resilient member is formed from rubber material.

43. An electronic scale according to claim 39 in which said flexible resilient member is secured to the mounting portion or the installation plate with an adhesion means, an adhesive agent, a fastening screw, a guide member, a mating connection or an integral molding process.

44. An electronic scale according to claim 40 in which said flexible resilient member is secured to the mounting portion or the installation plate with an adhesion means, an adhesive agent, a fastening screw, a guide member, a mating connection or an integral molding process.

45. An electronic scale according to claim 41 in which said flexible resilient member is secured to the mounting portion or the installation plate with an adhesion means, an adhesive agent, a fastening screw, a guide member, a mating connection or an integral molding process.

46. An electronic scale according to claim 42 in which said flexible resilient member is secured to the mounting portion or the installation plate with an adhesion means, an adhesive agent, a fastening screw, a guide member, a mating connection or an integral molding process.

47. An electronic scale comprising:
a diaphragm type load detection sensor;
a base; and
a platform, wherein
said diaphragm type load detection sensor comprises: a mounting portion attached to an installation plate; a strain generation portion provided on the mounting portion and having a load applied portion formed at the center thereof to which a load to be detected is applied; and a strain gauge provided on the strain generation portion, wherein said strain gauge has sensing elements evenly provided on substantially a whole periphery thereof and positioned at predetermined distances from the center axis of the load applied portion of the strain generation portion,
said platform is coupled to the load applied portion of the diaphragm type load detection sensor,
a projection is formed on the load applied portion at the center axis thereof and said sensing elements are provided on a surface of the strain generation portion at such side that is opposite to the side where said projection is formed,
said sensing elements have a pattern wherein the sensing element is disposed to receive a strain in the peripheral direction and a pattern wherein the sensing element is disposed to receive a strain in the radial direction, and
said mounting portion is attached to the installation plate with a flexible resilient member interposed therebetween.

48. An electronic scale comprising:
a diaphragm type load detection sensor;
a base; and
a platform, wherein
said diaphragm type load detection sensor comprises: a mounting portion attached to an installation plate with a flexible resilient member interposed therebetween; a strain generation portion provided on the mounting portion and having a load applied portion formed at the center thereof to which a load to be detected is applied; and a strain gauge provided on the strain generation portion, wherein said strain gauge has sensing elements evenly provided on substantially a whole periphery thereof and positioned at predetermined distances from the center axis of the load applied portion of the strain generation portion,
said platform is coupled to the load applied portion of the diaphragm type load detection sensor,
a projection is formed on the load applied portion at the center axis thereof and said sensing elements are provided on a surface of the strain generation portion at such side that is opposite to the side where said projection is formed,
said sensing elements have a pattern wherein the sensing element is disposed to receive a strain in the peripheral direction and a pattern wherein the sensing element is disposed to receive a strain in the radial direction, and
said strain gauge has terminals provided outside of the sensing elements and is disposed on the strain generation portion in such manner that said sensing elements are positioned on the strain generation portion and said terminals are positioned on the mounting portion.

49. An electronic scale according to claim 47 in which said flexible resilient member is formed from rubber material.

50. An electronic scale according to claim 48 in which said flexible resilient member is formed from rubber material.

51. An electronic scale according to claim 47 in which said flexible resilient member is secured to the mounting portion or the installation plate with an adhesion means, an adhesive agent, a fastening screw, a guide member, a mating connection or an integral molding process.

52. An electronic scale according to claim 48 in which said flexible resilient member is secured to the mounting portion or the installation plate with an adhesion means, an adhesive agent, a fastening screw, a guide member, a mating connection or an integral molding process.

53. An electronic scale according to claim 49 in which said flexible resilient member is secured to the mounting portion or the installation plate with an adhesion means, an adhesive agent, a fastening screw, a guide member, a mating connection or an integral molding process.

54. An electronic scale according to claim 50 in which said flexible resilient member is secured to the mounting portion or the installation plate with an adhesion means, an adhesive agent, a fastening screw, a guide member, a mating connection or an integral molding process.

55. An electronic scale using a load detection unit comprising:
a diaphragm type load detection sensor;
a case;
a transmission assembly; and
a support member, wherein
said diaphragm type load detection sensor has a mounting portion, a strain generation portion provided on the mounting portion and having a load applied portion formed at the center thereof to which a load to be detected is applied, and a strain gauge provided on the strain generation portion;
said case is attached to an installation plate for guiding the diaphragm type load detection sensor;
said transmission assembly transmits a load to be detected to the load applied portion of the diaphragm type load detection sensor;
said support member supports the transmission assembly on the case;
said strain gauge has sensing elements evenly provided on substantially a whole periphery thereof and positioned at predetermined distances from the center axis of the load applied portion of the strain generation portion;
a projection is formed on the load applied portion at the center axis thereof and said sensing elements are provided on a surface of the strain generation portion at such side that is opposite to the side where said projection is formed; and
said sensing elements have a pattern wherein the sensing element is disposed to receive a strain in the peripheral direction and a pattern wherein the sensing element is disposed to receive a strain in the radial direction;
the electronic scale further comprising at least one of a flexible resilient member contained in the case and interposed between the mounting portion of the diaphragm type load detection sensor and the installation plate, and another flexible resilient member provided at such side of the transmission assembly that receives a load to be detected.

56. An electronic scale using a load detection unit comprising:
a diaphragm type load detection sensor;
a case;
a transmission assembly; and
a support member, wherein said diaphragm type load detection sensor has a mounting portion, a strain generation portion provided on the mounting portion and having a load applied portion formed at the center thereof to which a load to be detected is applied, and a strain gauge provided on the strain generation portion;

said case is attached to an installation plate for guiding the diaphragm type load detection sensor;

said transmission assembly transmits a load to be detected to the load applied portion of the diaphragm type load detection sensor;

said support member supports the transmission assembly on the case;

said strain gauge has sensing elements evenly provided on substantially a whole periphery thereof and positioned at predetermined distances from the center axis of the load applied portion of the strain generation portion;

a projection is formed on the load applied portion at the center axis thereof and said sensing elements are provided on a surface of the strain generation portion at such side that is opposite to the side where said projection is formed;

said sensing elements have a pattern wherein the sensing element is disposed to receive a strain in the peripheral direction and a pattern wherein the sensing element is disposed to receive a strain in the radial direction; and said strain gauge has terminals provided outside of the sensing elements and is disposed on the strain generation portion in such manner that said sensing elements are positioned on the strain generation portion and said terminals are positioned on the mounting portion;

further comprising at least one of a flexible resilient member contained in the case and interposed between the mounting portion of the diaphragm type load detection sensor and the installation plate, and another flexible resilient member provided at such side of the transmission assembly that receives a load to be detected.

57. An electronic scale using a load detection unit according to claim 55 in which said at least one of the flexible resilient member or another flexible resilient member is formed from rubber material.

58. An electronic scale using a load detection unit according to claim 56 in which said at least one of the flexible resilient member or another flexible resilient member is formed from rubber material.

59. An electronic scale using a load detection unit according to claim 55 in which said transmission assembly is movably coupled to the load applied portion.

60. An electronic scale using a load detection unit according to claim 56 in which said transmission assembly is movably coupled to the load applied portion.

61. An electronic scale using a load detection unit according to claim 57 in which said transmission assembly is movably coupled to the load applied portion.

62. An electronic scale using a load detection unit according to claim 58 in which said transmission assembly is movably coupled to the load applied portion.

63. An electronic scale using a load detection unit comprising:
a diaphragm type load detection sensor;
a case;
a transmission assembly; and
a support member, wherein
said diaphragm type load detection sensor has a mounting portion, a strain generation portion provided on the mounting portion and having a load applied portion formed at the center thereof to which a load to be detected is applied, and a strain gauge provided on the strain generation portion;

said case is attached to an installation plate for guiding the diaphragm type load detection sensor;

said transmission assembly transmits a load to be detected to the load applied portion of the diaphragm type load detection sensor;

said support member supports the transmission assembly on the case;

said strain gauge has sensing elements evenly provided on substantially a whole periphery thereof and positioned at predetermined distances from the center axis of the load applied portion of the strain generation portion;

a projection is formed on the load applied portion at the center axis thereof and said sensing elements are provided on a surface of the strain generation portion at such side that is opposite to the side where said projection is formed;

said sensing elements have a pattern wherein the sensing element is disposed to receive a strain in the peripheral direction and a pattern wherein the sensing element is disposed to receive a strain in the radial direction; and said support member is a leaf spring including an outer peripheral strip permanently coupled to the case, an inner peripheral strip freely coupled to the transmission assembly, and flexible strips for coupling therebetween.

64. An electronic scale using a load detection unit comprising:
a diaphragm type load detection sensor;
a transmission assembly; and
a support member, wherein
said diaphragm type load detection sensor has a mounting portion, a strain generation portion provided on the mounting portion and having a load applied portion formed at the center thereof to which a load to be detected is applied, and a strain gauge provided on the strain generation portion;

said case is attached to an installation plate for guiding the diaphragm type load detection sensor;

said transmission assembly transmits a load to be detected to the load applied portion of the diaphragm type load detection sensor;

said support member supports the transmission assembly on the case;

said strain gauge has sensing elements evenly provided on substantially a whole periphery thereof and positioned at predetermined distances from the center axis of the load applied portion of the strain generation portion;

a projection is formed on the load applied portion at the center axis thereof and said sensing elements are provided on a surface of the strain generation portion at such side that is opposite to the side where said projection is formed;

said sensing elements have a pattern wherein the sensing element is disposed to receive a strain in the peripheral direction and a pattern wherein the sensing element is disposed to receive a strain in the radial direction;

said strain gauge has terminals provided outside of the sensing elements and is disposed on the strain generation portion in such manner that said sensing elements are positioned on the strain generation portion and said terminals are positioned on the mounting portion; and said support member is a leaf spring including an outer peripheral strip permanently coupled to the case, an inner peripheral strip freely coupled to the transmission assembly, and flexible strips for coupling therebetween.

65. An electronic scale using a load detection unit according to claim 55 in which said support member is a leaf spring including an outer peripheral strip permanently coupled to the case, an inner peripheral strip freely coupled to the transmission assembly, and flexible strips for coupling therebetween.

66. An electronic scale using a load detection unit according to claim 56 in which said support member is a leaf spring including an outer peripheral strip permanently coupled to the case, an inner peripheral strip freely coupled to the transmission assembly, and flexible strips for coupling therebetween.

67. An electronic scale using a load detection unit according to claim 57 in which said support member is a leaf spring including an outer peripheral strip permanently coupled to the case, an inner peripheral strip freely coupled to the transmission assembly, and flexible strips for coupling therebetween.

68. An electronic scale using a load detection unit according to claim 58 in which said support member is a leaf spring including an outer peripheral strip permanently coupled to the case, an inner peripheral strip freely coupled to the transmission assembly, and flexible strips for coupling therebetween.

69. An electronic scale using a load detection unit comprising:
a diaphragm type load detection sensor;
a case;
a transmission assembly; and
a support member, wherein
said diaphragm type load detection sensor has a mounting portion, a strain generation portion provided on the mounting portion and having a load applied portion formed at the center thereof to which a load to be detected is applied, and a strain gauge provided on the strain generation portion;
said case is attached to an installation plate for guiding the diaphragm type load detection sensor;
said transmission assembly transmits a load to be detected to the load applied portion of the diaphragm type load detection sensor;
said support member supports the transmission assembly on the case;
said strain gauge has sensing elements evenly provided on substantially a whole periphery thereof and positioned at predetermined distances from the center axis of the load applied portion of the strain generation portion;
a projection is formed on the load applied portion at the center axis thereof and said sensing elements are provided on a surface of the strain generation portion at such side that is opposite to the side where said projection is formed;
said sensing elements have a pattern wherein the sensing element is disposed to receive a strain in the peripheral direction and a pattern wherein the sensing element is disposed to receive a strain in the radial direction;
said strain gauge has terminals provided outside of the sensing elements and is disposed on the strain generation portion in such manner that said sensing elements are positioned on the strain generation portion and said terminals are positioned on the mounting portion;
said transmission assembly is movably coupled to the load applied portion; and
said support member is a leaf spring including an outer peripheral strip permanently coupled to the case, an inner peripheral strip freely coupled to the transmission assembly, and flexible strips for coupling therebetween.

70. An electronic scale using a load detection unit according to claim 59 in which said support member is a leaf spring including an outer peripheral strip permanently coupled to the case, an inner peripheral strip freely coupled to the transmission assembly, and flexible strips for coupling therebetween.

71. An electronic scale using a load detection unit according to claim 60 in which said support member is a leaf spring including an outer peripheral strip permanently coupled to the case, an inner peripheral strip freely coupled to the transmission assembly, and flexible strips for coupling therebetween.

72. An electronic scale using a load detection unit according to claim 61 in which said support member is a leaf spring including an outer peripheral strip permanently coupled to the case, an inner peripheral strip freely coupled to the transmission assembly, and flexible strips for coupling therebetween.

73. An electronic scale using a load detection unit according to claim 62 in which said support member is a leaf spring including an outer peripheral strip permanently coupled to the case, an inner peripheral strip freely coupled to the transmission assembly, and flexible strips for coupling therebetween.

74. An electronic scale using a load detection unit according to claim 64 in which said flexible strips are plural beams formed in the direction of rotation about the center axis of the inner peripheral strip.

75. An electronic scale using a load detection unit according to claim 65 in which said flexible strips are plural beams formed in the direction of rotation about the center axis of the inner peripheral strip.

76. An electronic scale using a load detection unit according to claim 66 in which said flexible strips are plural beams formed in the direction of rotation about the center axis of the inner peripheral strip.

77. An electronic scale using a load detection unit according to claim 67 in which said flexible strips are plural beams formed in the direction of rotation about the center axis of the inner peripheral strip.

78. An electronic scale using a load detection unit according to claim 68 in which said flexible strips are plural beams formed in the direction of rotation about the center axis of the inner peripheral strip.

79. An electronic scale using a load detection unit according to claim 69 in which said flexible strips are plural beams formed in the direction of rotation about the center axis of the inner peripheral strip.

80. An electronic scale using a load detection unit according to claim 70 in which said flexible strips are plural beams formed in the direction of rotation about the center axis of the inner peripheral strip.

81. An electronic scale using a load detection unit according to claim 71 in which said flexible strips are plural beams formed in the direction of rotation about the center axis of the inner peripheral strip.

82. An electronic scale using a load detection unit according to claim 72 in which said flexible strips are plural beams formed in the direction of rotation about the center axis of the inner peripheral strip.

83. An electronic scale using a load detection unit according to claim 73 in which said flexible strips are plural beams formed in the direction of rotation about the center axis of the inner peripheral strip.

* * * * *